US012252271B2

(12) United States Patent
Smith et al.

(10) Patent No.: US 12,252,271 B2
(45) Date of Patent: Mar. 18, 2025

(54) METHODS AND SYSTEMS FOR ASSEMBLY AND INSTALLATION OF AIRFRAME CROWN MODULES

(71) Applicant: The Boeing Company, Chicago, IL (US)

(72) Inventors: Daniel R. Smith, Woodinville, WA (US); Darrell D. Jones, Mill Creek, WA (US); Jeremy Evan Justice, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 307 days.

(21) Appl. No.: 17/454,276

(22) Filed: Nov. 10, 2021

(65) Prior Publication Data

US 2022/0153437 A1    May 19, 2022

Related U.S. Application Data

(60) Provisional application No. 63/115,050, filed on Nov. 18, 2020.

(51) Int. Cl.
*B64F 5/10*     (2017.01)
*B23P 21/00*    (2006.01)
*B64C 1/06*     (2006.01)

(52) U.S. Cl.
CPC ............. *B64F 5/10* (2017.01); *B23P 21/004* (2013.01); *B64C 1/061* (2013.01); *B64C 1/068* (2013.01); *B23P 2700/01* (2013.01)

(58) Field of Classification Search
CPC .. B64F 5/10; B64F 5/50; B23P 21/004; B23P 2700/01; B64C 1/061; B64C 1/068; B64D 2011/0046; Y10T 29/49826–49829
See application file for complete search history.

(56) References Cited

U.S. PATENT DOCUMENTS

| 9,644,765 B2 | 5/2017 | Breuer et al. | |
| 2008/0205763 A1* | 8/2008 | Marsh ........................ | B64F 5/10 |
| | | | 382/190 |
| 2011/0024565 A1* | 2/2011 | Koefinger ............... | B64C 1/068 |
| | | | 244/131 |
| 2012/0137487 A1* | 6/2012 | Umlauft .................... | B64F 5/10 |
| | | | 29/431 |
| 2013/0019446 A1 | 1/2013 | Venskus et al. | |
| 2013/0284868 A1* | 10/2013 | Moje ......................... | B64C 1/06 |
| | | | 29/407.01 |

(Continued)

FOREIGN PATENT DOCUMENTS

| CA | 2280414 A1 * | 12/1999 | ............. B62D 65/02 |
| CA | 2280414 C  * | 10/2000 | ............. B62D 65/02 |
| WO | 2012084205 A2 | 6/2012 | |

OTHER PUBLICATIONS

European Patent Office Extended Search Report, dated Apr. 11, 2022, regarding Application No. 21207539.4, 9 pages.

(Continued)

*Primary Examiner* — Jun S Yoo
(74) *Attorney, Agent, or Firm* — Yee & Associates, P.C.

(57) ABSTRACT

Systems and methods are provided for assembling an aircraft. The method includes receiving an upper half barrel section of fuselage that is in a crown up orientation and installing a crown module into the upper half barrel section.

25 Claims, 11 Drawing Sheets

(56) References Cited

U.S. PATENT DOCUMENTS

| | | | |
|---|---|---|---|
| 2016/0158940 A1* | 6/2016 | Brockway | B25J 9/1687 901/41 |
| 2016/0252898 A1* | 9/2016 | Sahadeo | G05B 19/4183 700/116 |
| 2016/0354883 A1* | 12/2016 | Vogt | B23P 19/04 |

OTHER PUBLICATIONS

Netherlands Patent Office Written Opinion and Search Report with English Translation, dated Jul. 19, 2021, regarding Application No. NL2027429, 12 pages.

* cited by examiner

METHODS AND SYSTEMS FOR ASSEMBLY AND INSTALLATION OF AIRFRAME CROWN MODULES

CROSS-REFERENCE TO RELATED APPLICATION

This application claims the benefit of U.S. Provisional Patent Application Ser. No. 63/115,050, filed Nov. 18, 2020, and entitled "Methods and Systems for Assembly and Installation of Airframe Crown Modules;" which is incorporated herein by reference in its entirety.

FIELD

The disclosure relates to the field of aircraft, and in particular, to fabrication of aircraft such as the installation of crown modules.

BACKGROUND

In the aerospace industry, operations relating to transport and assembly of airframe components are performed in fixed cells. In each cell, a structure is scanned and/or indexed to the cell, and then tools, equipment, and/or workers are brought to that portion of the structure needing to be worked upon in that cell. This process of scanning and/or indexing occurs every time a new structure is brought to the cell. Furthermore, when a structure is moved to a next cell, it is again scanned and/or indexed to the cell and the necessary tools, equipment, and/or workers are brought to that portion of the structure needing to be worked upon in that cell. Current assembly methods require tools, tooling and technicians to enter the barrel sections, which is a portion of a fuselage, through barrel ends or doorways. The tooling and tools have to be set up in place within the barrel section. When work is completed, the tooling, tools and technicians have to be transported out through barrel ends or doorways.

Therefore, it would be desirable to have a method and apparatus that take into account at least some of the issues discussed above, as well as other possible issues.

SUMMARY

Embodiments described herein provide for continuous line assembly layouts and systems that enable work to be performed on moving airframe components which are pulsed or moved continuously in a process direction to cross the paths of stations which perform work on the airframe components. The work may include laying up a preform for hardening into a composite part, hardening the composite part in an autoclave, installing frames, cutting out holes for windows or doors, etc. Particular embodiments are directed to the fabrication and installation of crown modules into an upper half barrel section of fuselage. These arrangements provide a technical benefit over prior systems because they reduce amounts of space required for fabrication and assembly at a factory floor, increase throughput, and reduce downtime.

In one aspect, a method for assembling an aircraft is provided. The method includes receiving an upper half barrel section of fuselage that is in a crown up orientation; and installing a crown module into the upper half barrel section.

In another aspect, a method for fabricating a crown module is provided. The method includes pulsing a ceiling grid in a process direction, providing additional components for the crown module just in time to a plurality of work stations that perform assembly of the crown module; and operating the work stations to assemble the crown module during pauses between pulses.

In still another aspect, a system is provided that includes a plurality of work stations that install crown module components onto a ceiling grid, a track that advances the ceiling grid in a process direction through the work stations, and a feeder line associated with one of the work stations, the feeder line operable to provide a crown module component to the work stations just in time for installation onto the ceiling grid.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The airframe components discussed herein may be fabricated from metal or may be fabricated as composite parts. Composite parts, such as Carbon Fiber Reinforced Polymer (CFRP) parts, are initially laid-up in multiple layers that together are referred to as preforms. Individual fibers within each layer of a preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
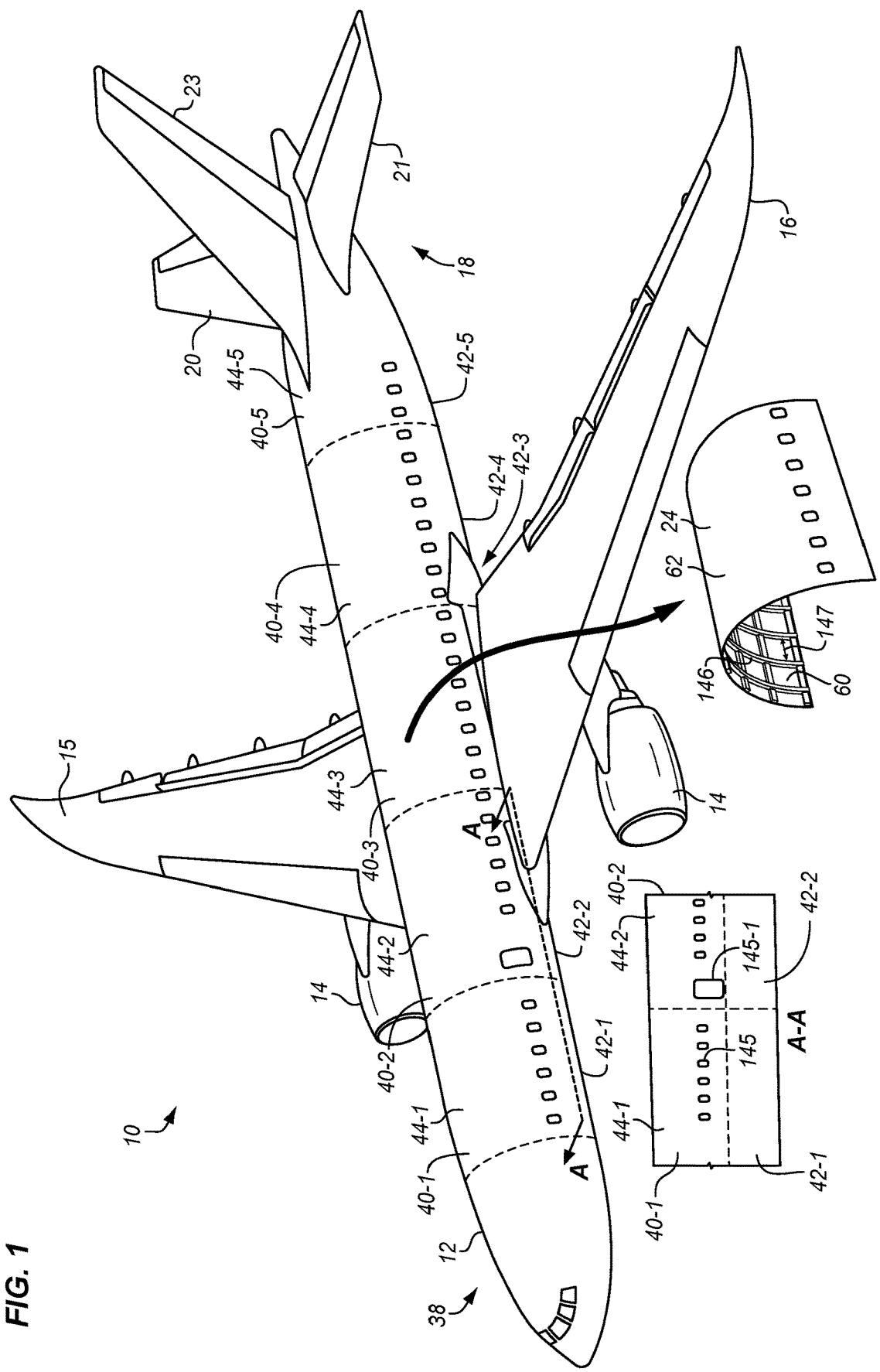
FIG. 1 illustrates an aircraft fabricated from half barrel sections.

Turning now to FIG. 1, an illustration of an aircraft 10 is depicted in which an illustrative embodiment may be implemented. In this illustrative example, aircraft 10 has a right wing 15 and left wing 16 attached to fuselage 12. One each of engines 14 are attached to right wing 15 and left wing 16. Embodiments of aircraft 10 are known with additional engines and different engine placements. Fuselage 12 includes a tail section 18 and a nose section 38. Horizontal stabilizer 20, horizontal stabilizer 21, and vertical stabilizer 23 are attached to tail section 18 of fuselage 12. Aircraft 10 is an example of an aircraft where the majority of the fuselage 12 is formed from multiple half barrel sections 24, the fabrication of which is partially illustrated in FIG. 2. The multiple half barrel sections 24, when attached together, form the majority of fuselage 12.

As mentioned, fuselage 12 is fabricated from multiple half barrel sections 24. Half barrel sections 24 are configured to be either an upper half barrel section 40 or a lower half barrel section 42 which are ultimately joined together to form a full barrel section 44. FIG. 1 depicts several full barrel sections including: 44-1, 44-2, 44-3, 44-4, and 44-5. For completeness, full barrel section 44-1 is fabricated using upper half barrel section 40-1 and lower half barrel section 42-1, full barrel section 44-2 is fabricated using upper half barrel section 40-2 and lower half barrel section 42-2, full barrel section 44-3 is fabricated using upper half barrel section 40-3 and lower half barrel section 42-3, full barrel section 44-4 is fabricated using upper half barrel section 40-4 and lower half barrel section 42-4, and full barrel section 44-5 is fabricated using upper half barrel section 40-5 and lower half barrel section 42-5. The full barrel sections 44-1, 44-2 correspond to view A-A and illustrate that the full barrel sections 44 are serially fastened into fuselage 12. Lower half barrel section 42-3 is sometimes referred to as a wing box as the right wing 15 and left wing 16 attach to this section.

All of the above described half barrel sections (e.g., upper half barrel section 40 and lower half barrel section 42), unless specifically otherwise described, will be referred to generically as half barrel section 24. As shown in FIG. 1, each half barrel section 24 includes one or more frames 146, separated at a frame pitch 147, which helps define an inner mold line (EVIL) loft 60 and an outer mold line (OML) loft 62 for the half barrel section 24. In some embodiments, the half barrel section 24 comprises a hardened composite skin part or a metal skin part, such as those awaiting installation of window surrounds 145 and door surrounds 145-1 (view A-A) and frames 146 to enhance rigidity.

Figure 2:
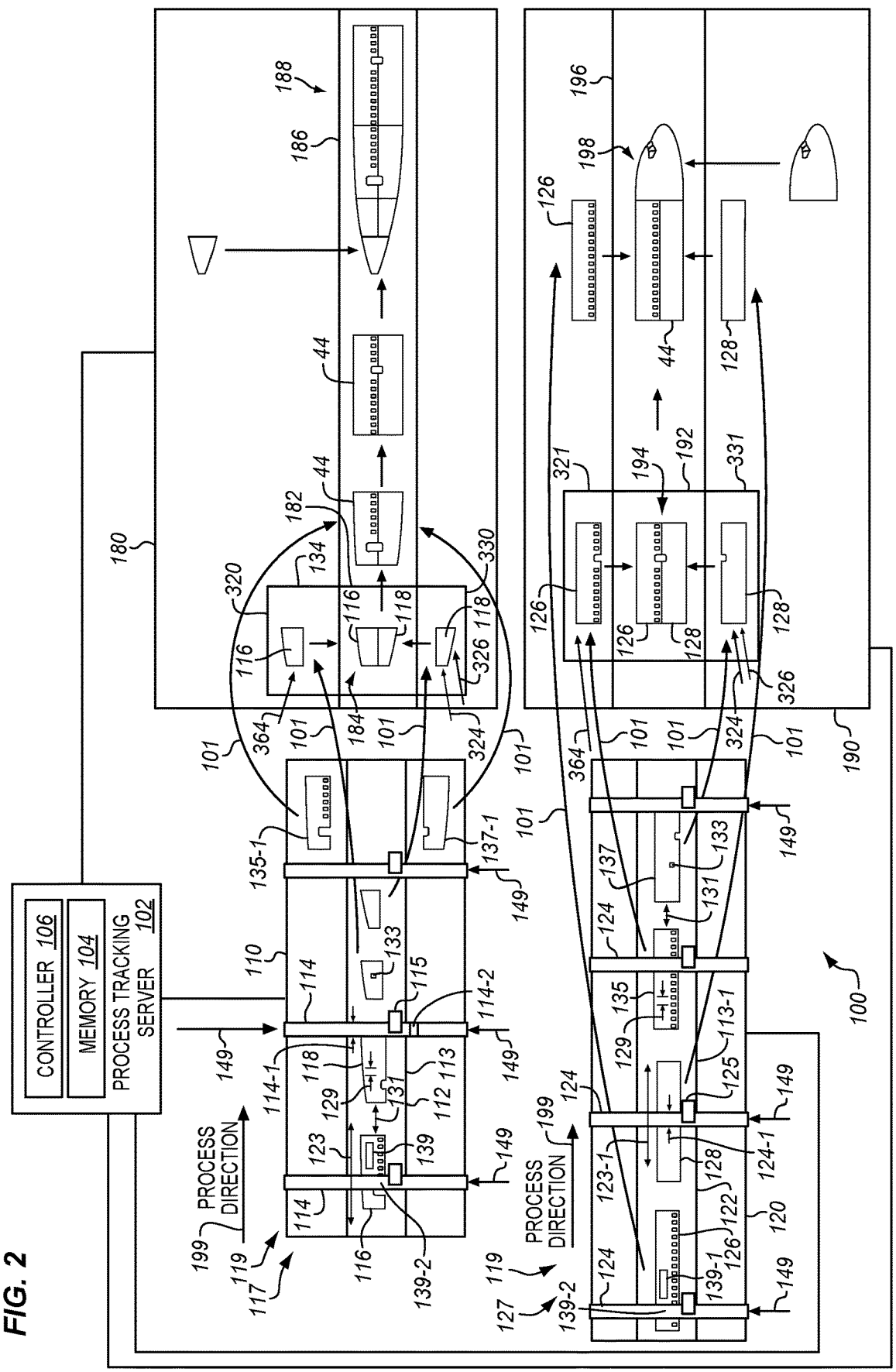
FIG. 2 depicts an assembly environment for a factory in an illustrative embodiment.

FIG. 2 depicts an assembly environment 100 in an illustrative embodiment. Assembly environment 100 comprises an arrangement of machinery and tools that facilitates efficient and repeatable fabrication of aircraft, such as aircraft 10. Assembly environment 100 has been enhanced to enable large airframe components, such as those for wing panels or sections of fuselage, to be fabricated and assembled on continuous, micro pulsed and/or pulsed assembly lines. This enables the portion of the structure needing work to be brought to workers, tools, and equipment, instead of requiring workers, tools, and equipment be brought to or into the structure. Assembly environment 100 provides a substantial benefit by reducing the amount of non-value added time expended during the assembly of an airframe, while also reducing the amount of factory space occupied by increasing work density. An embodiment has one half barrel section 24 as a composite skin part of one aircraft model and another half barrel section 24 as a metal skin part progressing serially down the assembly environment 100.

A process tracking server 102 tracks and/or manages the operations of assembly environment 100 via memory 104 and controller 106, which in the illustrated embodiment includes assembly lines 110, 120. Assembly line 110 operates to perform assembly operations on an upper half barrel section 116 and a lower half barrel section 118. Assembly line 120 operates to perform assembly operations on an upper half barrel section 126 and a lower half barrel section 128. One difference between assembly lines 110 and 120 is that assembly line 110 is configured for the assembly of non-cylindrical half barrel sections while assembly line 120 is configured for the assembly of cylindrical half barrel sections. Generally, operations of assembly lines 110 and 120 are the same, and reference numbers referring to components found in both assembly lines 110, 120 will be used, for example, work stations 114, 124 where work stations 114 are within assembly line 110 and work stations 124 are within assembly line 120. A similar methodology is used when referring to the components that are assembled in the assembly lines 110, 120. For example, upper half barrel section 116 is assembled in assembly line 110, while upper half barrel section 126 is assembled within assembly line 120. Similarly, lower half barrel section 118 is assembled in assembly line 110, while lower half barrel section 128 is assembled within assembly line 120. When a difference between the two assembly lines 110, 120 is relevant, an explanation will be provided herein.

As further discussed herein the process tracking server 102 directs the operations of one or more work stations 114, 124 in the assembly environment 100. In this embodiment, the process tracking server 102 includes a memory 104 that stores one or more Numerical Control (NC) programs for operating the assembly lines 110, 120. Controller 106 of the process tracking server 102 may further process feedback from the work stations 114, 124 and/or assembly lines 110, 120, and provide instructions to the work stations 114, 124 or reports to an operator based on such feedback.

In one embodiment, RFID readers or other indexing components 115, 125 associated with a work station 114, 124, enable the act of indexing to directly provide instructions to a work station 114, 124. The instructions are for the portion of the upper half barrel section 116, 126 and lower half barrel section 118, 128 within the purview 114-1, 124-1 of the work stations 114, 124. In such an embodiment, the instructions can be passed between controller 106 and the particular work station. Controller 106 may be implemented, for example, as custom circuitry, as a hardware processor executing programmed instructions, or some combination thereof. Memory 104 stores instructions for operating controller 106 and stores digital data.

In this embodiment, assembly environment 100 includes assembly line 110 for fabricating sections of fuselage 12 that exhibit non-uniform cross sections across their length, and further includes assembly line 120 for fabricating sections of fuselage 12 that exhibit largely uniform cross sections across their length. The assembly line 110 processes the upper half barrel section 116 and a complementary lower half barrel section, lower half barrel section 118, respectively. The assembly line 120 processes the upper half barrel section 126 and a complementary lower half barrel section, lower half barrel section 128, respectively. When upper or lower is not relevant, upper half barrel section 116 and lower half barrel section 118 are sometimes referred to together herein as a half barrel section 117, while upper half barrel section 126 and lower half barrel section 128 are sometimes referred to together herein as half barrel section 127. Arcuate sections 119 refer to any type of barrel section including half barrel sections 117, 127, quarter barrel sections, and one third barrel sections, with or without a uniform cross-section.

Half barrel sections 117, 127 correspond to half barrel sections 24 after processing through assembly environment 100. The assembly lines 110, 120 discussed herein may further be operated to fabricate multiple sets of half barrel sections 117, 127 or other arcuate sections 119.

The assembly line 110 is configured with work stations 114 that are capable of accommodating the upper half barrel sections 116 and lower half barrel sections 118 with more exotic shapes such as tapered, as well as other arcuate sections 119 near the nose section 38 or tail section 18. Work stations 114 associated with assembly line 110 exhibit a broader range of motion in order to accommodate the tapered nature of these half barrel sections 117 and non-uniform cross section arcuate sections 119.

The assembly line 110 further includes a track 112, along which upper half barrel sections 116 and lower half barrel sections 118 proceed in a process direction 199. Track 112 includes a drive system 113 to advance the half barrel sections 117 along the track 112. The track 112 brings the half barrel sections 117 in a process direction 199 to tools and equipment (not shown) disposed at work stations 114, 124 which are serially arranged in a process direction 199.

The track 112 may comprise a series of discrete stanchions having rollers, a rail or set of rails (not shown), etc., and airframe components at the track 112 may be pulsed incrementally in the process direction 199 across the work stations 114, 124. Work stations 114, 124 are serially aligned, and the half barrel sections 117 or arcuate sections 119 proceed through the work stations 114, 124 serially. While only a few work stations are shown, many are contemplated, since work stations 114, 124 can be configured to perform operations such as, but not limited to, demolding, installing window surrounds, installing door surrounds, trimming manufacturing excess, installing frames, cutting out window manufacturing excess or otherwise removing material, NDI inspection, edge sealing, cutting out door manufacturing excess, installing windows and installing doors. Some work stations 114, 124 may perform multiple of the above listed tasks, while other work stations 114, 124 are dedicated to a single task.

In one embodiment, the work stations 114, 124 are spaced and operated such that work is performed by multiple work stations on an upper half barrel section 116 of fuselage 12 simultaneously. The same is true for lower half barrel sections 118. In a further embodiment, the work stations 114 are arranged at a work density, at least in part, based on a takt time for the half barrel section 117 or the arcuate sections 119 being fabricated. The same is true for work stations 124 with respect to upper half barrel sections 126 and lower half barrel sections 128. That is, the work stations 124 are arranged at a work density, at least in part, based on a takt time for the half barrel section 127 or the arcuate sections 119 being fabricated.

The assembly line 110 processes the upper half barrel section 116 and delivers it to assembly stage 320, for example, configured as a crown module attach station, for attachment of a crown module 364. The assembly line 110 processes the lower half barrel section 118 for delivery to assembly stage 330, for example, configured as a floor grid attach station, for joining to a passenger floor grid 324 and/or a cargo floor grid 326.

Figure 5:
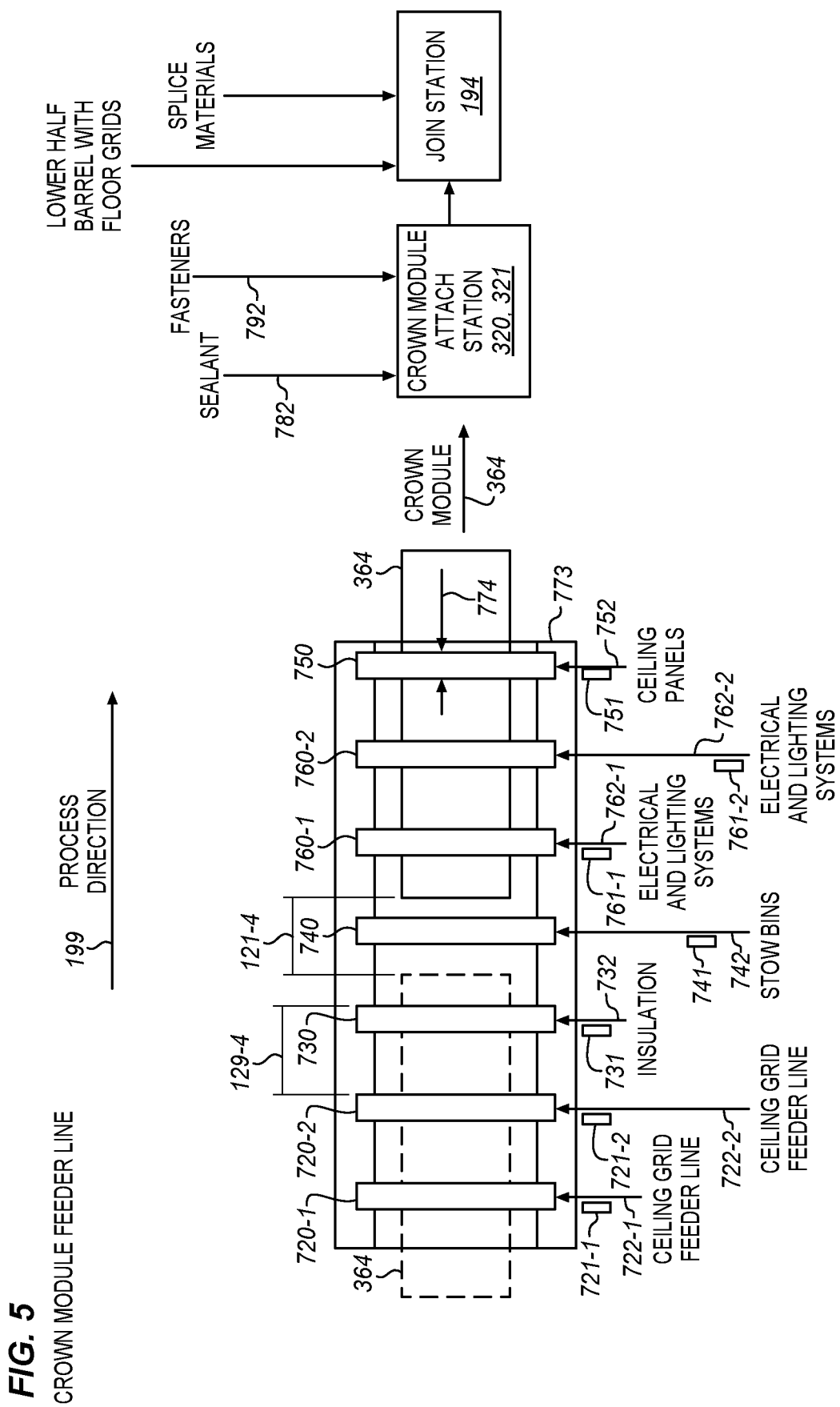
FIG. 5 is a block diagram of a crown module assembly line for installing crown modules into upper sections of fuselage in an illustrative embodiment.

In much the same way, work stations 124 are spaced and operated in the assembly line 120 to process the upper half barrel sections 126 and the lower half barrel sections 128, that is, half barrel sections 127 along a track 122 having a drive system 113-1. The assembly line 120 processes the upper half barrel section 126 and delivers it to assembly stage 321 for joining to a crown module 364 as well as the lower half barrel section 128 which is delivered to an assembly stage 331 for joining to a passenger floor grid 324 and/or a cargo floor grid 326. It is understood that a crown module for upper half barrel section 116 is different than a crown module for upper half barrel section 126, since upper half barrel section 126 is represented as being cylindrical and longer than upper half barrel section 116, but for ease of understanding, both crown modules will be referred to herein as crown module 364. Similarly, no matter which lower half barrel section is being referred to, the passenger floor grid is referred to as passenger floor grid 324 and the cargo floor grid is referred to as cargo floor grid 326, the floor grids in combination being referred to herein in subsequent figures as floor grid 365 (FIG. 5).

The assembly line 120 includes track 122, along which upper half barrel section 126 and lower half barrel section 128 proceed in the process direction 199 in a similar fashion to that described above for the assembly line 110. The assembly line 120 further includes work stations 124 having indexing components 125. The work stations 124, indexing components 125, and track 122 may be implemented in a similar fashion to similarly recited components of the assembly line 110. However, the work stations 124 may differ in that they may be more tightly conformed to each of the upper half barrel section 126 and lower half barrel section 128 being worked upon. There is less cross sectional variation between the upper half barrel section 126 and the lower half barrel section 128 than upper half barrel section 116 and the lower half barrel section 118. As mentioned above, upper half barrel section 126 and the lower half barrel section 128 of assembly line 120 are more uniform in shape and size than of the upper half barrel section 116 and the lower half barrel section 118 of the assembly line 110.

In further embodiments, additional assembly lines fabricate right wing 15 and left wing 16 for assembly together with the fuselage 12 to form a complete airframe. The assembly lines 110, 120 are either operated in a pulsed fashion where the upper half barrel sections 116, 126 and lower half barrel sections 118, 128 advance in a process direction 199 a distance equal to a pulse length 123, 123-1 or a micro pulse 129. A micro pulse 129 is less than pulse length 123, 123-1, and in an embodiment, is equal to a frame pitch 147 between frames 146 of the upper half barrel sections 116, 126 and lower half barrel sections 118, 128 or a fraction or multiple thereof. A pulse length 123, or a length of a micro pulse 129 can be the same for assembly lines 110 and 120, or they can be different. Frame pitch 147 in an embodiment is about 18 to about 36 inches. After the micro pulse 129, the upper half barrel sections 116, 126 and lower half barrel sections 118, 128 pause, then micro pulse again 129 in a process direction 199.

Another embodiment has the upper half barrel sections 116, 126 and lower half barrel sections 118, 128 continuously advancing in the process direction 199 without pause. Thus, the assembly lines 110, 120 discussed herein enable half barrel sections 117, 127 to proceed with a desired takt across multiple different work stations in a pulsed, micro pulsed, or continuous fashion.

During these processes, tooling such as layup mandrels may be placed onto or removed from the tracks 112, 122 as needed. In one embodiment, the track 112, 122 include a drive system 113, 113-1, such as a chain drive, that moves the half barrel sections 117, 127, although in further embodiments the sections are independently driven along the tracks 112, 122.

In one embodiment, and referring to assembly line 110, the upper half barrel sections 116 and the lower half barrel sections 118 are pulsed synchronously at the same time by the same amount of distance in the process direction 199. The work stations 114 then perform work upon the upper half barrel section 116 or the lower half barrel section 118 in pauses between the pulses and/or during pauses at a common takt time. Thus, during the fabrication process, multiple work stations 114 work upon the upper half barrel sections 116 and/or the lower half barrel sections 118 during the same pause between micro pulses 129 and/or during micro pulse 129.

Similarly, and referring to assembly line 120, the upper half barrel sections 126 and the lower half barrel sections 128 are pulsed synchronously at the same time by the same amount of distance in the process direction 199. The work stations 124 then perform work upon the upper half barrel section 126 or the lower half barrel section 128 in pauses between the pulses and/or during pauses at a common takt time. Thus, during the fabrication process, multiple work stations 124 work upon the upper half barrel sections 126 and/or the lower half barrel sections 128 during the same pause between micro pulses 129 and/or during micro pulse 129.

In one embodiment of assembly line 110, one or more work stations 114 also perform their work independently or synchronously upon the same half barrel section, half barrel section 117, or the arcuate sections 119 during a pulse. Similarly, and in regard to assembly line 120, one or more work stations 124 also perform their work independently or synchronously upon the same half barrel section, half barrel section 127, or the arcuate sections 119 during a pulse. Such work stations might be referred to as traveling work stations 139, 139-1 as they are attached to the half barrel section and move with the half barrel section. This work may include Non-Destructive Inspection (NDI), trimming of a manufacturing excess, or application of a sealant or other processes. In further embodiments, the half barrel sections 117, 127 proceed continuously along the track 112, 122, and the work stations 114, 124 perform work on the half barrel sections 117, 127 as the half barrel sections 117, 127 and the traveling work stations 139, 139-1 attached thereto continue to move.

In some embodiments of assembly line 110 or 120, the half barrel sections 117, 127 are spaced with predetermined gaps 131 such as equal to a micro pulse 129 distance such as a fraction or multiple of frame pitch 147 or any distance less than or equal to a length of the half barrel section 117, 127 or the arcuate sections 119. Gaps 131 help to account for production delays, such as re-work or out of position work of the half barrel section 117, 127 or the arcuate sections 119 or work station 114, 124 maintenance and/or technician break time.

Re-work or out of position work is rarely required, but can be performed in certain circumstances when a portion of the half barrel section 117, 127 or the arcuate sections 119 needing re-work or out of position work is between work stations 114, 124 or within work stations that do not need to perform work such as a window surround installation station opposite a lower half barrel section 118. This enables unaccounted-for delays to be absorbed into the production process. The rework or out of position work discussed above can be performed within gaps 131 between the work stations 114, 124. Furthermore, in one embodiment, the half barrel section 117, 127 or the arcuate sections 119 continues to progress through the work stations 114, 124 while the rework or out-of-position work is being performed. Thus, the assembly environment 100 does not stop advancing in process direction 199 to work upon half barrel section 117, 127 or the arcuate sections 119 to accommodate rework or out-of-position work. Such out of position work can include scheduled and unscheduled maintenance.

During the movement or in between micro pulses 129 of pulse length 123, 123-1, the half barrel sections 117, 127 or the arcuate sections 119 encounter the indexing components 115, 125 at the work stations 114, 124. The indexing components 115, 125 physically interact with or nondestructively inspect indexing features 133 on or in the upper half barrel sections 116, 126 and lower half barrel sections 118, 128 and enable alignment to the work stations 114, 124 before work is performed.

The indexing features 133, such as physical features or Radio Frequency Identifier (RFID) chips, are engaged by an indexing components 115, 125 associated with the work station 114, 124. Each indexing component 115, 125 conveys to the work station 114, 124 a 3D characterization of the upper half barrel sections 116, 126 and lower half barrel sections 118, 128 within a purview 114-1, 124-1 of the work station 114, 124. The indexing also enables the determination of which tasks that a work station 114, 124 is to accomplish on the particular half barrel section. The work/task are based on the information that the indexing features 133 convey to the indexing components 115, 125.

Referring back to FIG. 1, an example of 3D characterization is of the inner mold line (EVIL) loft 60 and/or outer mold line (OML) loft 62. The indexing described above results in instructions to the work station 114, 124 about the work to be performed by the work station 114, 124 upon the upper half barrel sections 116, 126 and lower half barrel sections 118, 128. This indexing process can be performed multiple times, and at the same time, per pulse, or micro pulse 129, for respective multiple work stations, work stations 114, 124. The work stations 114, 124 may then perform the work during the pause between micro pulses 129 or during the micro pulses 129 themselves.

The indexing components 115, 125 can comprise hard stops, pins, holes, or grooves that are complementary to the indexing features 133 for physical securement thereto. An embodiment has many indexing features arrayed upon the upper half barrel sections 116, 126 and lower half barrel sections 118, 128, for example, in a manufacturing excess. In further embodiments, the indexing components 115, 125 can comprise sensors, such as laser, ultrasonic, or visual inspection systems that track and then align with indexing features 133.

Additional indexing features, indexing features 133, also include RFID chips. RFID readers are another embodiment of indexing component 115, 125, that read the RFID chips. These non-contact techniques may be utilized, for example, within assembly lines 110, 120 that continuously move upper half barrel sections 116, 126 and lower half barrel sections 118, 128 and may further be used to control movement of the half barrel sections 117 and/or arcuate sections 119.

In further embodiments, indexing components 115, 125 of hard stops, pins, holes, or grooves that are complementary to the indexing features 133 are utilized for continuous movement systems where traveling work stations 139, 139-1 are utilized. In such embodiments, engagement of indexing features 133 to indexing components 115, 125 occur during the advancement of the upper half barrel sections 116, 126 and lower half barrel sections 118, 128 within purview 114-1, 124-1 of the next work station. The work station 114, 124 can track the upper half barrel sections 116, 126 and lower half barrel sections 118, 128 as they advance in the process direction 199. Continuing, traveling work stations 139, 139-1 are attached in a work station 114, 124 to the upper half barrel sections 116, 126 or lower half barrel sections 118, 128 and ride along with the half barrel sections 117, 127 as it progresses in pulse, micro pulse, or continuously.

The traveling work station 139, 139-1 performs its work upon the half barrel sections 117, 127 and then separates and returns to the attachment point 139-2 for future use. An example of the traveling work station 139, 139-1 is a flex track device or some similar device that follows a track removably installed onto the upper half barrel section 116, 126 and/or lower half barrel section 118, 128.

Prior to entry into the assembly environment 100, the upper half barrel sections 116, 126 and lower half barrel sections 118, 128 are laid up upon a layup mandrel (not shown) orientated with the crown 135, 135-1 up and the keel 137, 137-1 up, respectively. The orientation of the lower half barrel sections 118, 128 is maintained from demold from the layup mandrel, through floor grid 365 installation, and up to where the lower half barrel sections 118, 128 are inverted into a keel 137, 137-1 down orientation. This inversion occurs in an inversion station (not shown) just prior to pulsing to join station 194. This configuration enables different work stations to serially process the upper half barrel sections 116, 126 and lower half barrel sections 118, 128 in a pulsed manner through the same work stations during fabrication.

In one embodiment, the orientation of upper half barrel sections 116, 126 and lower half barrel sections 118, 128 on assembly line 110, 120, respectively, is set by a layup mandrel upon which the sections were laid up. The layup mandrel progresses from layup through cure with a preform laid-up onto it. After hardening, the upper half barrel sections 116, 126 and lower half barrel sections 118, 128 are then removed from the respective layup mandrels without changing the upper half barrel sections 116, 126 and lower half barrel sections 118, 128 orientation.

In an embodiment, multiple aircraft models are processed in serial on assembly lines 110, 120. Upper half barrel sections 116, 126 and lower half barrel sections 118, 128 for one model serially proceed down the assembly line 110, 120 followed by the upper half barrel sections 116, 126 and lower half barrel sections 118, 128 of a different model. For example, a lower half barrel section 118, 128 progresses down an assembly line 110, 120 followed by a complementary upper half barrel section. Likewise, these lower half barrel sections 118, 128 and upper half barrel sections 116, 126 might be followed by another aircraft model's lower half barrel sections 118, 128 and upper half barrel sections 116, 126, followed by the lower half barrel sections 118, 128 and upper half barrel sections 116, 126 of yet another model and so forth between aircraft models, if such a production methodology meets a need. Additionally, more than one assembly line 110, 120 each are also envisioned in some embodiments to make sure that upper half barrel sections 116, 126 and lower half barrel sections 118, 128 are produced at a desired rate.

In some embodiments, work stations 114, 124 discussed herein have the capability of performing work on different portions of upper half barrel sections 116, 126 and lower half barrel sections 118, 128 and are able to accommodate different diameters from model to model. Each indexing operation between indexing components 115, 125 and indexing features 133 tells the work station 114, 124 what lower half barrel sections 118, 128 and upper half barrel sections 116, 126 and which airplane model is within its purview 114-1, 124-1 and what work needs to be performed, or if no work needs to be performed. For example, window manufacturing excess cut out stations may refrain from creating window cut outs when a lower half barrel section 118, 128 is within their purview 114-1, 124-1 since a window cut out is not needed.

A process tracking server 102 tracks and/or manages the operations of assembly lines 110, 120 discussed herein, for example, by directing the operations of one or more work stations 114, 124 in the assembly environment 100. In this embodiment, the process tracking server 102 includes a memory 104 that stores one or more Numerical Control (NC) programs for operating the assembly lines 110, 120. A controller 106 of the process tracking server 102 may further process feedback from the work stations 114, 124 and/or assembly lines 110, 120, and provide instructions to the work stations 114, 124 or reports to an operator based on such feedback. In one embodiment, RFID readers or other indexing components 125 enable the act of indexing to directly provide instructions to a work station 114, 124 for the portion of the upper half barrel section 116, 126 and lower half barrel section 118, 128 within the purview 114-1, 124-1 of the work station 114, 124. In such an embodiment, the instructions can be passed between controller 106 and the particular work station. Controller 106 may be implemented, for example, as custom circuitry, as a hardware processor executing programmed instructions, or some combination thereof. Memory 104 stores instructions for operating controller 106 and may comprise a suitable receptacle for storing digital data.

Figure 3:
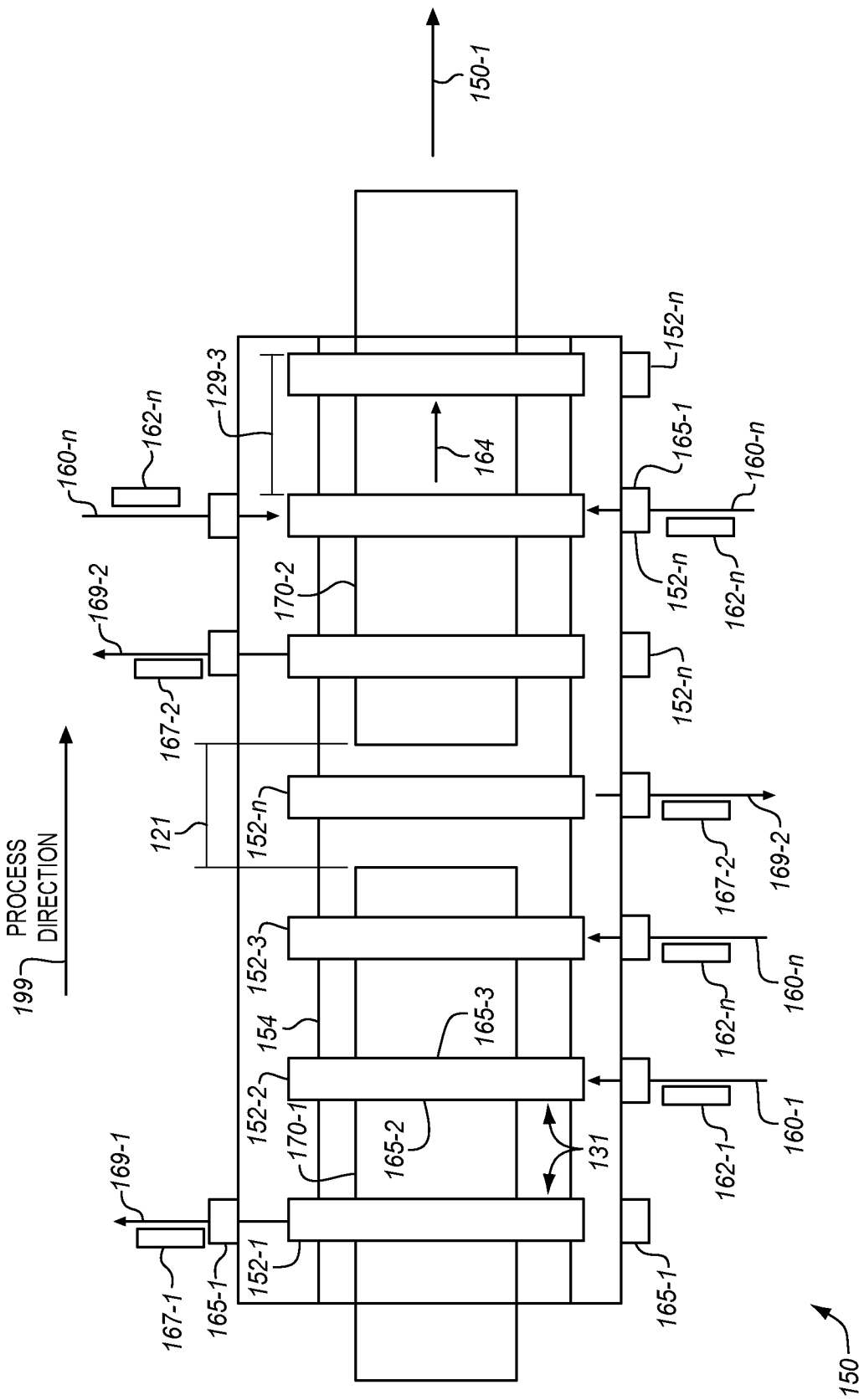
FIG. 3 depicts an assembly line for a factory in an illustrative embodiment.

According to FIG. 2, each work station 114 at an assembly line 110 may be fed/supplied materials and/or components by a feeder line 149 (e.g., based on a takt time for a section of fuselage, and as illustrated in FIG. 3), and these materials and/or components are affixed to the upper half barrel section 116, 126 and lower half barrel section 118, 128 being worked upon by the work stations 114, 124. Feeder lines 149 provide additive materials/components to the work stations 114, 124. Each feeder line 149 is designed to generate materials at a takt time in order to provide the additive material/component to a work station 114, 124 just in time (JIT) for assembly onto a larger structure (e.g., a section of fuselage), which is also pulsed at a takt time. That is, the feeder lines 149 deliver the components JIT to the work stations 114, 124 in an order of usage by the work stations 114, 124. In one embodiment, the feeder lines 149 that have a takt time equal to a fraction of a fuselage takt time.

The takt times of the feeder lines 149, and/or the assembly lines 110, 120 need not be the same. For instance, an upper half barrel section 116 and a lower half barrel section 118 may be micro pulsed through several work stations 114 at the same time. The upper half barrel section 116 and lower half barrel section 118 are indexed to the work stations 114 and each dedicated feeder line performs, for example, NDI, window surround installation, door surround installation, window manufacturing excess trim/removal, door manufacturing excess trim/removal, installing windows and installing doors etc. Feeder lines 149 also include output from the work stations 114, including NDI inspection data and any excess trimmed off of upper half barrel section 116 and lower half barrel section 118. A similar scenario can occur for assembly line 120 and the various components therein and assembled therein.

In a further example, the feeder line 149 provide frames 146 JIT to a work station 114 that installs the frames 146 onto upper half barrel section 116 and lower half barrel section 118. Likewise, feeder lines 149 provide window surrounds JIT to a work station 114 where window surrounds are installed and door surrounds JIT to a work station 114 where door surrounds are installed. For each feeder line 149, production times are designed based on the takt of an associated work station 114. The feeder lines 149 each serially pulse components during fabrication, and completed components arrive at each work station 114 at a common takt time. This takt time design proceeds through each of the feeder lines 149 from the smallest part to the largest final assembly.

If a takt time cannot be achieved, it is possible to adjust the work statement of a particular work station to reduce or increase the amount of work occurring at the particular work station. In a further embodiment, it is possible to add or remove a work station 114 from the process based upon a work statement and a desired takt time for the entirety of assembly line 110. Takt time is considered to be a number of minutes per month, divided by a number of desired units (e.g., of aircraft, stringers, frames, etc.) per month. The sum of micro pulse takt times equals a pulse of takt time. That is, after a number of micro pulses equal to a full pulse, an entire unit has advanced by its length through an assembly line 110. For examples, the assembly line 110 is comprised of an integer multiple of standard module work stations which enable it to be designed upfront to have blank, or unused, work stations at low rates and add work stations that are functional, if required for certain processes into those unused work stations, to accommodate higher product output in areas that are sensitive to product output.

According to FIG. 2, and referring specifically to assembly line 120, and similar to assembly line 110, each work station 124 at an assembly line 120 may be fed/supplied materials and/or components by a feeder line 149 (e.g., based on a takt time for half barrel section 127, and as illustrated in following FIG. 3), and these materials and/or components are affixed to the upper half barrel section 126 and lower half barrel section 128 being worked upon by the work stations 124. Feeder lines 149 provide additive materials/components to the work stations 124. Each feeder line 149 is designed to generate materials at a takt time in order to provide the additive material/component to a work station just in time (JIT) for assembly onto a larger structure (e.g., a section of fuselage), which is also pulsed at a takt time. The feeder line 149 takt time may be the same or different from the takt time of assembly line 120. That is, the feeder lines 149 deliver the components JIT to the work stations 124 in an order of usage by the work stations 124. In one embodiment, the feeder lines 149 that have a takt time equal to or at a fraction of a fuselage takt time.

The takt times of the feeder lines 149, and/or the assembly lines 120 need not be the same. For instance, an upper half barrel section 126 and lower half barrel section 128 may be micro pulsed through several work stations 124 at the same time. The upper half barrel section 126 and lower half barrel section 128 is indexed to the work stations 124 and each feeder line 149 performs NDI, window surround installation, door surround installation, window manufacturing excess trim/removal, door manufacturing excess trim/removal, installing windows and installing doors etc. Feeder lines 149 also include output from the work stations 124, including NDI inspection data and any excess trimmed off of upper half barrel section 126 and lower half barrel section 128. The feeder lines 149 synchronize to a pulse time or velocity of a main assembly line, to supply what is needed, when it is needed.

In a further example, the feeder line 149 provides the frames 146 JIT to a work station 124 that installs the frames 146 onto upper half barrel section 126 and lower half barrel section 128. Likewise, feeder lines 149 provide window surrounds JIT to work stations 124 where window surrounds are installed and door surrounds JIT to work stations 124 where door surrounds are installed. For each feeder line 149, production times are designed based on the takt of an associated work station 124. The feeder lines 149 each serially pulse components during fabrication, and completed components arrive at each work station 124 at a common takt time. This takt time design proceeds through each of the feeder lines 149 from the smallest part to the largest final assembly.

If a takt time cannot be achieved by the assembly line 120 or feeder line 149, it is possible to adjust the work statement of a particular work station to reduce or increase the amount of work occurring at the particular work station. In a further embodiment, it is possible to add or remove a work station 124 from the assembly line 120 based upon a work statement and a desired takt time for the entire assembly line. Takt time is considered to be a number of minutes per month, divided by a number of desired units (e.g., of aircraft, stringers, frames 146, etc.) per month. The sum of micro pulse takt times equals a full pulse of takt time. That is, after a number of micro pulses 129 equal to advancing by its length through an assembly line 120.

FIG. 2 further depicts the airframe assembly region 180 and the airframe assembly region 190, which receive the outputs of assembly lines 110 and 120 respectively. Upper half barrel sections 116, 126 and lower half barrel sections 118, 128 are joined into the various full barrel sections described with respect to FIG. 1. It is important to note that upper half barrel sections 116 and lower half barrel sections 118 come in various shapes and lengths as is depicted in FIG. 2.

Joining of upper half barrel section 116 and lower half barrel section 118 occurs within joining work station 182 and joining of upper half barrel section 126 and lower half barrel section 128 occurs within joining work station 192. Join station 184 is part of work station 182, and join station 194 is part of work station 192. The full barrel sections 44 that result proceed along tracks 186 and 196, to a work cell 188. In further embodiments, the operations of the assembly lines 110, 120 discussed herein are merged into a single assembly line.

Arrows 101 indicate where differently shaped upper half barrel sections 116 and lower half barrel section 118 are moved as they exit the assembly line 110 and enter airframe assembly region 180. For example, arrows 101 depict lower half barrel section 118 and upper half barrel section 116 being moved to an assembly stage 320 and assembly stage 330, respectively, and then to join station 184 for joining, and movement to different assembly lines, etc. Arrows 101 indicate where similarly shaped upper half barrel sections 126 and lower half barrel sections 128 are moved as they exit the assembly line 120 and enter airframe assembly region 190. For example, arrows 101 depict lower half barrel section 128 and upper half barrel section 126 being moved to an assembly stage 321 and assembly stage 331, respectively, and then to join station 194 for joining, and movement to different assembly lines, etc.

In an embodiment, upper half barrel section 116 is joined with crown module 364 and lower half barrel section 118 is joined with cargo floor grid 326 and/or passenger floor grid 324 in assembly stages 320 and 330, respectively. Assembly stages 320 and 330 are part of the upper half barrel section 116 and lower half barrel section 118 assembly process much like assembly stages 321 and 331 are part of the upper half barrel section 126 and lower half barrel section 128 assembly process where crown modules 364, cargo floor grids 326, and passenger floor grids 324 are similarly installed. Likewise join station 184 is part of the assembly process for the upper half barrel section 116 and lower half barrel section 118 and similarly corresponds to join station 194 which is part of the assembly process for the upper half barrel section 126 and lower half barrel section 128.

FIG. 3 depicts an assembly line 150 for a component 170-1, 170-2 in a factory in an illustrative embodiment. The assembly line 150 may be utilized for any component 170-1, 170-2, such as for post-hardening or pre-hardening fabrication and/or assembly processes and may be utilized as a feeder line 149 (FIG. 2) to provide components 170-1, 170-2 that are used by downstream assembly lines 150. The component 170-1 may be different and distinct from component 170-2 or components 170-1 and 170-2 may be exactly the same. For instance, and relevant to subsequent figures, components 170-1, 170-2 are intercostals 522, floor beams 524, or might be crown modules 364 or floor grids 365 in various stages of completion.

Component 170-1 and component 170-2 progress through serially arranged work stations 152-1 through 152-$n$, wherein these multiple work stations 152 perform work on component 170-1 while additional work stations perform work on component 170-2 during a micro pulse 129-3 or pause between micro pulses 129-3. It is understood that as components move down assembly line 150 that only a single work station might be performing work on a single component, depending on the progress of the components through the assembly line 150.

In this embodiment, the assembly line 150 includes work stations 152-1 through 152-$n$ that perform work such as layup, inspection, hardening, trimming, pick and placement, joining, fastening, etc., as the components 170-1, 170-2 proceed along track 154. The work stations 152 perform work on the components 170-1, 170-2 such as those mentioned in the preceding paragraph during a same pause between pulses (FIG. 2) or micro pulses (FIG. 2) of the components 170-1, 170-2 in the process direction 199.

In the illustrated embodiment, one of work stations 152-$n$ is disposed at a gap 121 between components 170-1, 170-2 which move or pulse in the process direction 199. While disposed at the gap 121, work station 152-$n$ receives maintenance and/or inspection, and/or technicians operating the work station 152-$n$ may engage in a break while the work station 152-$n$ is not performing work on one of the components 170.

In one example of the illustrated embodiment, exit line 169-1 carries inspection data 167-1 from work station 152-1 while exit line 169-2 carries removed material 167-2 from one of work stations 152-$n$. An example of inspection data 167-1 is the inspection data for a component 170 from a work station 152 configured as an NDI station. Similarly, when component 170 is mechanically trimmed, the removed material 167-2 is taken away from two work stations 152-$n$ on exit lines 169-2, the work stations 152-$n$ being configured as trimming stations.

Feeder lines 160-1 through 160-$n$ provide subcomponents 162-1, 162-$n$ to work stations 152-2, 152-3 and one of work station 152-$n$. In one example, the subcomponent 162-1 is coupled to the component 170 present in work station 152-2. The subcomponents 162-1, 162-$n$ arrive at work stations 152-2, 152-$n$, and these work stations 152-2, 152-$n$ utilize the subcomponents 162-1, 162-$n$ by consuming, placing, or otherwise utilizing the subcomponents 162-1, 162-$n$ to facilitate fabrication of components 170-1, 170-2.

A path 164 is through an ingress 165-2 and egress 165-3 for each of the work stations 152, an example of which is illustrated at work station 152-2, for the components 170. In this embodiment, each feeder line 160-1, 160-$n$ provides subcomponents 162-1, 162-$n$ to a work station 152-1, 152-2, 152-3, 152-$n$, and may provide the subcomponents 162-1, 162-$n$ via an ingress/egress port 165-1 that is independent of the path 164.

Removed material 167-2 may also be removed via ingress/egress ports 165-1. In one embodiment, the actions of the feeder lines 160-1, 160-$n$ and assembly line 150 are coordinated to facilitate just-in-time (JIT) delivery of components to subsequent assembly line 150-1 to which it feeds according to a takt-time for the component 170-1, 170-2, which the work stations 152 work to. In one embodiment, the assembly line 150 is utilized for fabricating crown modules 364 (FIGS. 4 & 5), and feeder lines 160 provide crown module components such as support structure, stow bins, lighting, ceiling panels, and insulation that is provided just in time (JIT) for joining into a crown module.

In one embodiment, one or more of work stations 152-1, 152-2, 152-3, and 152-$n$ comprise NDI stations, rework stations downstream of the NDI stations that address any out of tolerance conditions identified by NDI inspection. Many of these work stations 152-1, 152-2, 152-3, 152-$n$ include a feeder line 160-1, 160-$n$ devoted to the inputting of material intended for addition at that work station 152-1, 152-$n$. The assembly line 150 is representative of one or all of assembly line 110, assembly line 120, airframe assembly region 180, and airframe assembly region 190. As further described herein, the assembly line 150 can also be representative of assembly stages 320, 321, 330, and 331.

Figure 4:
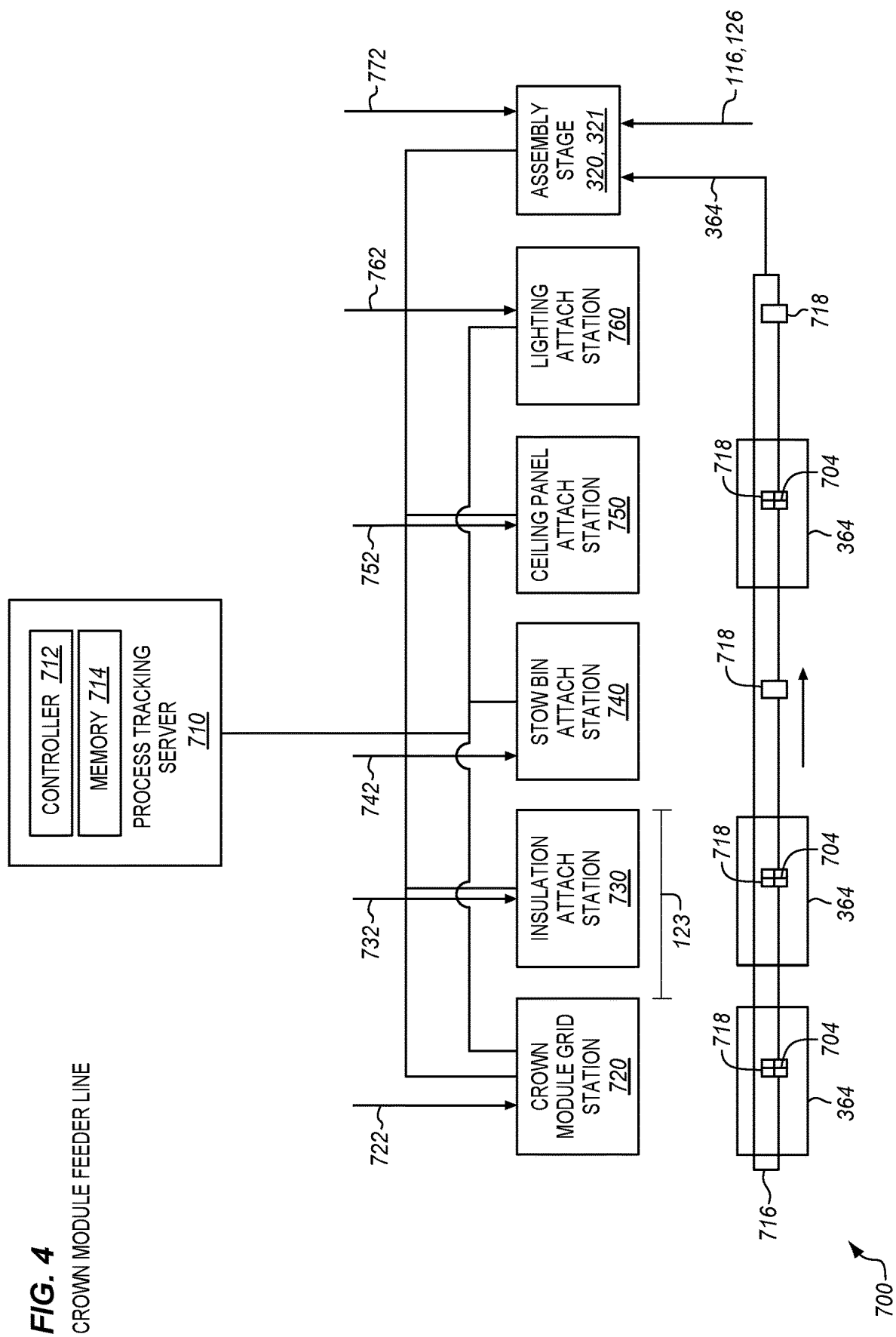
FIG. 4 is a block diagram of a crown module assembly line for installing floor grids into lower sections of fuselage in an illustrative embodiment.

FIG. 4 is a block diagram of a crown module feeder line 700 for installing crown modules 364 into upper half barrel sections 116, 126 of fuselage 12 in an illustrative embodiment. Specifically, FIG. 4 depicts a line of serially arranged work stations with pulse length 123 between each. As shown in FIG. 4, the crown module feeder line 700 includes a process tracking server 710, which utilizes a controller 712 and a memory 714 to track the progress of an upper half barrel section 116, 126 to an assembly stage 320, 321 (see also FIG. 2). Assembly stages 320 and 321 are both used in the description of FIG. 4 since it is understood that the description applies to both upper half barrel sections 116 and 126 as introduced in FIG. 2 and that both incorporate some embodiment of a crown module 364.

The crown module 364 is advanced via track 716, and indexed to work stations 720, 730, 740, 750, 760 and assembly stage 320, 321 via an indexing feature 704 (similar to indexing feature 133 described with respect to FIG. 2) coupled to crown module 364. Each of the work stations 720, 730, 740, 750, 760 are coupled to an indexing component 718 (similar to indexing components 115 and 125 described with respect to FIG. 2).

Crown modules 364 are indexed to work stations 720, 730, 740, 750, 760, via an indexing feature 704 being interfaced to indexing component 718. As shown, multiple of each of crown module 364 are shown on track 716. An embodiment has a crown module 364 at each of work stations 720, 730, 740, 750, 760 and at assembly stage 320, 321 and full pulsing from one work station to the next work station. Feeder lines 722, 732, 742, 752, 762, and 772 for each of work stations 720, 730, 740, 750, 760, and assembly stage 320, 321, as discussed herein may further be controlled according to micro pulse, full pulse, or continuous line fabrication techniques in order to ensure that materials are delivered just in time for installation. This may involve tracking and/or control to manage the progress of materials.

In this embodiment, the crown module feeder line 700 includes work station 720, a crown module grid work station, which assembles ceiling grids for crown modules 364. Feeder line 722 provides ceiling grid components to work station 720 for joining into the ceiling grid. The ceiling grid is then full pulsed to an insulation attach work station 730, which installs insulation. Feeder line 732 provides insulation to insulation attach work station 730 JIT for installation into the ceiling grid. The ceiling grid with insulation full pulses to stow bin attach work station 740. Stow bins, fasteners and other needed materials are delivered to stow bin attach work station 740 via feeder line 742. Stow bins are attached to the ceiling grid and insulation assembly within stow bin attach work station 740 before full pulse to ceiling panel attach work station 750. Ceiling panels and other needed materials are delivered to ceiling panel attach work station 750 JIT via feeder line 752. The ceiling panels are attached to the ceiling grid, insulation and stow bin assembly within ceiling panel attach work station 750 before full pulse to lighting attach work station 760. Lighting and other needed materials are delivered to lighting attach work station 760 JIT via feeder line 762. The lighting is attached to the ceiling grid, insulation, stow bin and ceiling panel assembly within lighting attach work station 760 before full pulse to assembly stage 320, 321 for installation of the completed crown module 364 into upper half barrel section 116, 126.

Feeder lines 722, 732, 742, 752, 762 provide various materials such as crown module components, fasteners, insulation, stow bins, ceiling panels, plumbing, electrical systems, lighting, etc., to the work stations 720, 730, 740, 750, 760 discussed herein.

In a further embodiment, a crown module 364 arrives just in time for install at assembly stage 320, 321 with ceiling grid, insulation, stow bins, ceiling panels, lighting, electric components and any plumbing, which are all installed during a full pulse into upper half barrel section 116, 126. Thus, in such an embodiment, no micro pulsing takes place and all assembly operations are performed during a full pulse length, pulse length 123.

FIG. 5 has the crown module 364 advanced by micro pulse 129-4 through work stations 720-1, 720-2, 730, 740, 760-1, 760-2, and 750 to arrive in a completed state at an assembly stage 320, 321 for crown module 364 for installation into an upper half barrel section 116, 126, in a full pulse length 123. The crown modules 364 are assembled in parallel to the upper half barrel section 116, 126 so that the crown module 364 arrives completed for installation to reduce the upper half barrel section 116, 126 time in assembly stage 320, 321 to as low as possible. The crown module 364 shown at the beginning of the work stations is shown as dashed, as it is understood that the components that are added at each work station are what eventually forms the crown module 364, which is shown in solid line leaving the work stations as the crown module 364 is completed, in certain implementations.

A feeder line 773 provides the crown module 364 to assembly stage 320 just-in-time and ready for installation into the upper half barrel section 116, 126. Again, it is mentioned that the crown module process is essentially the same for upper half barrel section 116 feeding into assembly stage 320 as it is for upper half barrel section 126 and assembly stage 321, which is why 116, 126 is used in the description, as well as 320, 321.

The crown module 364 has to be assembled in parallel to the upper half barrel section 116, 126 to reduce the time for the crown module 364 attachment in the assembly stage 320, 321 to as low as possible. The various crown modules are assembled inverted. The crown module 364 arrives at the assembly stage 320 ready for installation. The crown module 364 is assembled from ceiling grid components 721-1, 721-2, combined into a ceiling grid with, insulation 731, stow bins 741, and electrical and lighting systems 761-1, 761-2. Ceiling panels 751 are then added to the assembly.

It is noted that ceiling panel attach work station 750 and lighting attach work station 760 are shown in reversed positions in FIGS. 4 and 5. This is meant to illustrate that the assembly order is predicated by the architecture of the aircraft being assembled, and not by the factory. Other orders of work station are contemplated to be within the scope of this disclosure.

The crown module 364 begins assembly by micro pulses 129-4 through serially arranged work stations 720-1, 720-2, 730, 740, 760-1, 760-2, and 750 on feeder line 773 each with feeder lines 722-1, 722-2, 732, 742, 762-1, 762-2, 752, respectively, delivering crown module components Just in Time (JIT) of just the right part to the work stations 720-1, 720-2, 730, 740, 760-1, 760-2, and 750 for assembly into crown module 364. The ceiling grid components 721-1, 721-2 are delivered JIT to work stations 720-1, 720-2 via feeder line 722-1 and feeder line 722-2. Micro pulse 129-4 is illustrated as having a length equal to the space between two adjacent work stations or equal to the purview 774 or some multiple or fraction thereof.

The crown module 364 continues assembly on feeder line 773 by micro pulses 129-4 through serially arranged work stations 730, 740, 760-1, 760-2, and 750 each with feeder lines 732, 742, 762-1, 762-2, 752 delivering JIT the insulation 731, stow bins 741 added, electrical and lighting systems 761-1, 761-2 and then ceiling panels 751, respectively, for assembly into crown module 364. Optionally, ceiling panels 751 are placed into the crown module during installation into upper half barrel section 116, 126.

The work stations 720-1, 720-2, 730, 740, 760-1, 760-2, and 750 index to the crown module 364 as it advances through the floor grid feeder line, feeder line 773, during pauses between micro pulses 129-4 and/or during micro pulses 129-4 of the crown module 364. The crown module 364 is indexed to each of the serially arranged work stations 720-1, 720-2, 730, 740, 760-1, 760-2, and 750 singularly, or in multiples, to convey a 3D characterization of the crown module 364 within the purview 774 of each work station 720-1, 720-2, 730, 740, 760-1, 760-2, and 750 prior to work station 720-1, 720-2, 730, 740, 760-1, 760-2, and 750 work upon the crown module 364. The one or more work stations 720-1, 720-2, 730, 740, 760-1, 760-2, and 750 perform work upon the crown module 364 during pauses between micro pulses 129-4 and/or during micro pulse 129-4. Indexing features 704 may be on several portions of the crown module 364 or on several portions of a moveable jig conveying the crown module 364.

The crown module 364 is assembled in parallel to the upper half barrel section 116, 126 and arriving JIT at the assembly stage 320, 321 for installation into the upper half barrel section 116, 126. Each of feeder lines 722, 732, 742, 752, 762 are shown as the ends of an assembly fabrication/delivery line for a particular subcomponent. Feeder lines 722-1 and 722-2 place the ceiling grid components 721-1 and 721-2 into work stations 720-1 and 720-2, respectively and adding same to micro pulsing a ceiling grid (see crown module 364 depicted with dashed line). Feeder lines 732 and 742 respectively place the insulation 731 and the stow bins 741 into work stations 730 and 740, respectively, and adding same to micro pulsing ceiling grid. Feeder lines 762-1, 762-2 place electrical and lighting systems 761-1, 761-2 into work stations 760-1 and 760-2, respectively, and the micro pulsing crown module begins to take shape (as denoted by the solid lines). Feeder line 752 places the ceiling panels 751 into work station 750 which are added to complete the crown module 364, as denoted in FIG. 5.

While disposed at the gap 121-4, work station 740 receives maintenance and/or inspection, and/or technicians operating the work station 740 go on break and/or perform maintenance while the work station 740 is not performing work on crown module 364. While seven work stations and feeder lines are shown, any number of work stations or feeder lines are possible during crown module 364 fabrication.

The feeder lines for the various stow bins, other crown module features, floor grid elements, etc. discussed herein may be designed to fabricate integral singular components (e.g., entire crown modules or floor grids for placement into a section) for placement in their entirety into a fuselage section. In a further embodiment, the feeder lines provide multiple components at once. Thus, for example, stow bins 741 may be installed as a full length equal to that of the upper half barrel section 116, 126, or some fraction thereof. In a further example, installing the crown module 364 comprises installing an entirety of the crown module 364 for the upper half barrel section 116, 126, or a longitudinal fraction thereof. The feeder line 773 feeds the crown module 364 into assembly stage 320, 321, and along with feeder lines 782, 792 provide sealant and fasteners, respectively, to assembly stage 320, 321 just-in-time and ready for installation into the upper half barrel section 116, 126. After installation of crown module 364 into the upper half barrel section 116, 126, upper half barrel section 116, 126 is placed into join station 194. The feeder lines for the various stow bins, other crown module features, floor grid elements, etc. discussed herein may be designed to fabricate integral singular components (e.g., entire crown modules or passenger floor grids 324 or cargo floor grids 326) for placement into a half barrel section 117, 127 for placement in their entirety into a fuselage section.

In a further embodiment, the feeder lines provide multiple components at once. Thus, for example stow bins may be installed as a full length equal to that of the fuselage section, or some fraction thereof. The feeder line 773 feeds the crown module 364 into assembly stage 320, 321 and along with feeder lines 782, 792 provide sealant and fasteners, respectively, to assembly stage 320, 321 just-in-time and ready for installation into the upper half barrel section 116, 126. After installation of crown module 364 into the upper half barrel section 116, 126 upper half barrel section 116, 126 is placed into join station 194.

Not shown, vertical inversion station rotates the lower half barrel section 118, 128 about a longitudinal center line to place it in a keel down orientation. More specifically, the lower half barrel section 118, 128 is rotated about a longitudinal center line prior to joining to the upper half barrel section 116, 126 (shown in FIG. 7).

Figure 6:
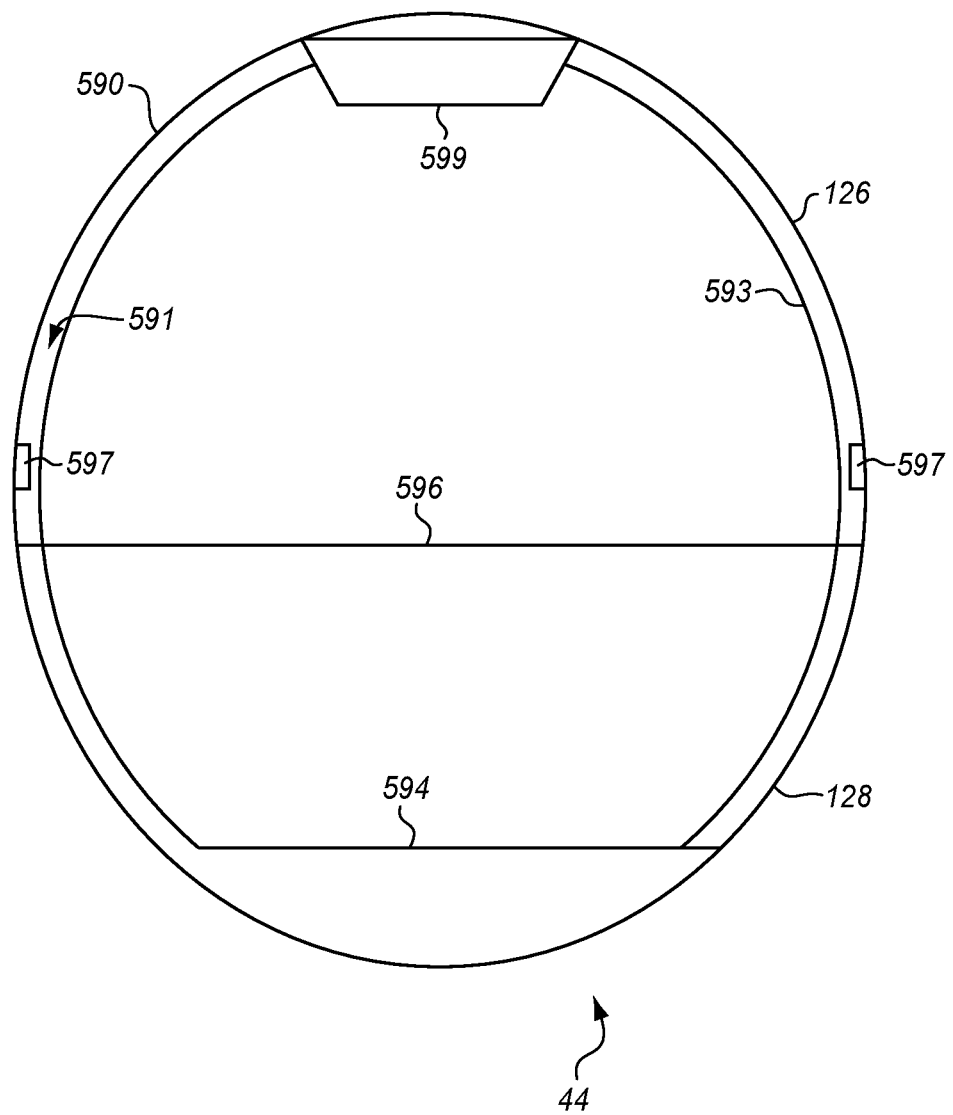
FIG. 6 depicts a cross section of a fuselage in an illustrative embodiment.

As described elsewhere herein, a join station 194 unites the lower half barrel section 128 to an upper half barrel section 126. This joining process results in the upper half barrel section 126 and the lower half barrel section 128 being longitudinally spliced together, including splicing the skin and the frames 590 and any surrounds thereat. A splice plate (not shown) may be installed entirely in the join station 194. In FIG. 6, a cross-section of a full barrel section 44 in join station 194 is depicted, which includes a passenger floor grid 596 and a cargo floor grid 594. FIG. 6 further illustrates that a crown module 599 and doubler 597 have been added to the full barrel section 44 of fuselage. As described herein, the crown module 599 includes stow bins and interior lighting, and these details are not shown in FIG. 6 for the sake of clarity. Insulation 591 and interior panels 593 are also shown as being installed.

Figure 7:
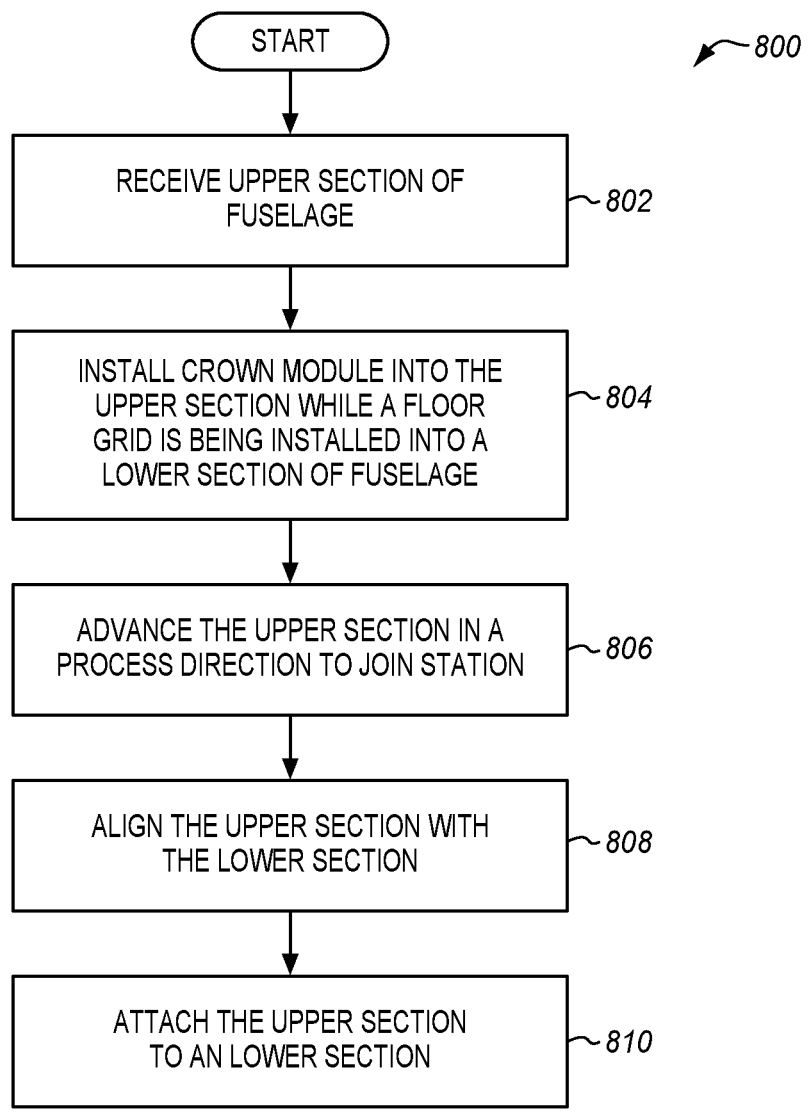
FIG. 7 is a flowchart depicting a method for utilizing the crown module assembly line of FIGS. 4 and 5 in an illustrative embodiment.

FIG. 7 is a flowchart depicting a method 800 for utilizing the crown module assembly lines of FIGS. 4 and 5 in an illustrative embodiment. Method 800 includes receiving 802 an upper half barrel section 116, 126 in a crown up orientation. Next, a crown module 364 is installed 804 into the upper half barrel section 116, 126 while a floor grid 365 is being installed into a lower half barrel section 118, 128. The upper half barrel section 116, 126 is advanced 806 in a process direction 199 to join station 194. The upper half barrel section 116, 126 is then aligned 808 with a respective lower half barrel section, lower half barrel section 118, 128. The upper half barrel section 116, 126 is then attached 810 to the lower half barrel section 118, 128. Micro pulsing and/or full pulsing as described herein are utilized in order to perform just in time assembly in a variety of techniques similar to those discussed herein.

The upper half barrel sections 116, 126 and lower half barrel sections 118, 128, by definition, have to have the same takt-time. In other words, both an upper half barrel section 126 and a lower half barrel section 128 are needed within the time interval demanded by a customer. Continuing, the amount of work to fabricate and process the lower half barrel section 128 could be more or less than the amount of work to fabricate and process the upper half barrel section 126, but the takt-time is same and is addressed in the upfront design of the assembly line 120.

In a further embodiment, the method of joining the upper half barrel section 116, 126 to the lower half barrel section 118, 128 is similar to that described above, but the upper half barrel section 116, 126 and the lower half barrel section 118, 128 both advance to the join station 194. The upper half barrel section 116, 126 and the lower half barrel section 118, 128 are aligned for joining in the join station 194, and splice plates are installed onto the upper half barrel section 116, 126 and/or the lower half barrel section 118, 128-2 to form a butt splice either via bonding and/or via multiple rows of fasteners and fay surface sealing.

Method 800 provides a technical benefit over prior techniques because it enables crown modules 364 to be installed into upper half barrel sections 116, 126 at the same time that cargo floor grid 326 and passenger floor grid 324 are being installed into a corresponding lower half barrel section, lower half barrel section 118, 128. This increases throughput and assembly efficiency as it requires a lot of coordination to install a cargo floor grid 326 and passenger floor grid 324 as well as the crown module 364 while using temporarily installed tooling within a full barrel section 44.

Figure 8:
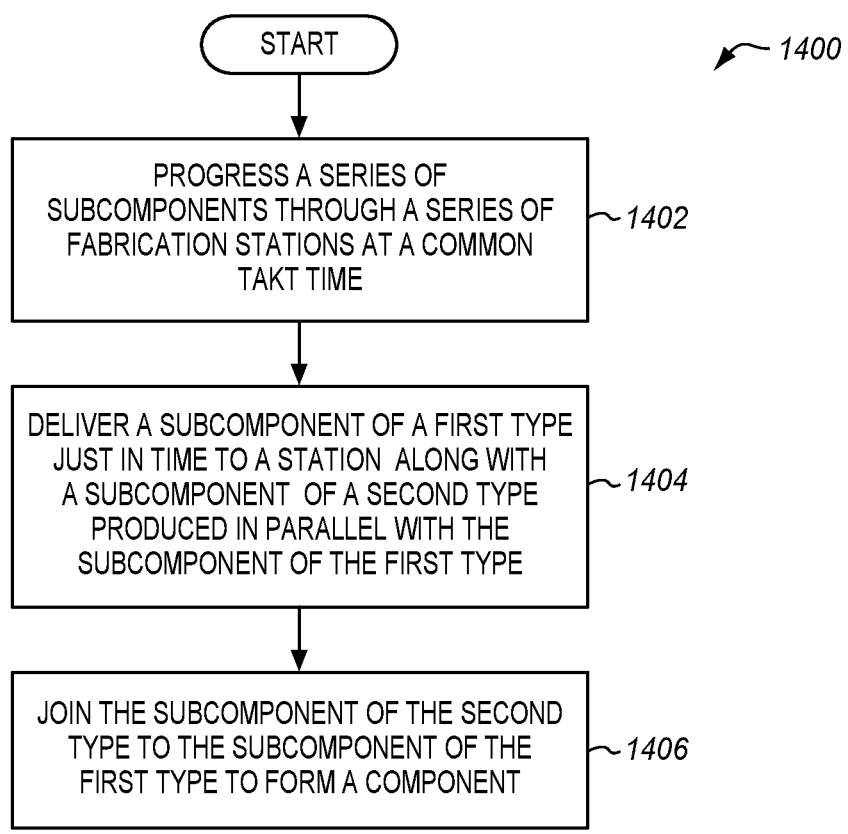
FIG. 8 is a flowchart illustrating a method of takt time assembly in an illustrative embodiment.

FIG. 8 is a flowchart illustrating a method 1400 of takt time assembly in an illustrative embodiment. Method 1400 includes progressing 1402 a series of subcomponents 162 (162-1 through 162-n) through a series of work stations 152 at a common takt time. In one embodiment, the subcomponents 162 are delivered according to the common takt time. Thus, the deliveries are provided JIT from a feeder line 160, and each feeder line 160 may have a common takt time or not. The feeder lines 160 may have their own takt time, and this takt time may be equal to a fraction of a fuselage takt time, or not.

The term takt-time needs further explanation. For example, and with reference to FIG. 3, there is a Takt time of Product (TTP) for each assembly line 150, as well as for each feeder line 160. The description applies to the other figures described herein, for example, assembly lines 110, 120, and feeder lines 149. Often the takt times are same but can be different, as feeder lines 160 always need to be synchronized with assembly lines 150. For example, if there was only one assembly line 150 and there were eight half barrel sections going down assembly line 150, combined with a product demand requiring eight half barrel sections every 32 available hours, the TTP for the assembly line 150 is 4 hours. The TTP is equal to pulse time only when pulse length is the full length of product produced. In case of a micropulsed line, where pulse length is a fraction of full product length, gaps 121 between products have to be accounted for, and the pulse time (PT) is much less. All feeder lines 160 need to support mainline TTP, PT, or velocity. As an additional example, if pulse length was equal to a frame pitch 147 (around 2 feet), then a frame feeder line would need to deliver a number of frames 146 (e.g., two) per frame station. On some half barrel sections 117 there may be no doors, so the feeder line 160 needs to supply two frames every pulse time. Some half barrel sections 117 include doors and, in those areas, frames 146 are not needed for at least a few micropulses. However, feeder lines 160 still have to synchronize to assembly line 150 pulse time. The feeder lines 160 can have greater TTP if the number of products per pulse is greater than one and with only one feeder line 160. If number of products is greater than one and the number of feeder lines 160 for that product is same as the number of products in feeder line 160, then PT of feeder line 160 is same as that of the assembly line 150. When there is no need to supply feeder products to assembly line 150, then PT is variable for the feeder line 160.

At the feeder lines 160, additional work stations perform work on subcomponents 162 during a pause between pulses of the subcomponents 162 in a process direction 199. Some subcomponents 162 may be produced in a continuous non-pulsed, non-micro pulsed fashion. Method 1400 includes delivering 1404 a subcomponent 162-1 just in time to a work station 152-2 along with a subcomponent 162-n produced in parallel with the subcomponent 162-1. The subcomponents 162 are delivered to the stations Just In Time (JIT) in an order of usage. Method 1400 includes joining 1406 the subcomponent 162-n to the subcomponent 162-1 to form a component 170-1. In one embodiment, the subcomponent 162 is a section (e.g., an upper half barrel section 126 or a lower half barrel section 128) of a fuselage. In a further embodiment, the component 170-1 is a full barrel section 44 formed from an upper half barrel section 126 and a lower half barrel section 128).

In further embodiments, the method 1400 further includes simultaneously performing work on the subcomponents 162 via more than one of the work stations 152. Depending on the embodiments, progressing comprises iteratively pulsing the subcomponents 162 by less than their length, then pausing while work is performed on the subcomponents 162. Alternatively, progressing comprises iteratively pulsing the subcomponents 162 at least their length, then pausing while work is performed on the subcomponents 162. Alternatively, progressing comprises continuously moving the subcomponents 162 while work is performed on the subcomponents 162. In pulsed embodiments, the first type of subcomponent 162-1 and the second type of subcomponent 162-n are joined into the component 170 at a work station 152 after a pulse.

Figure 9:
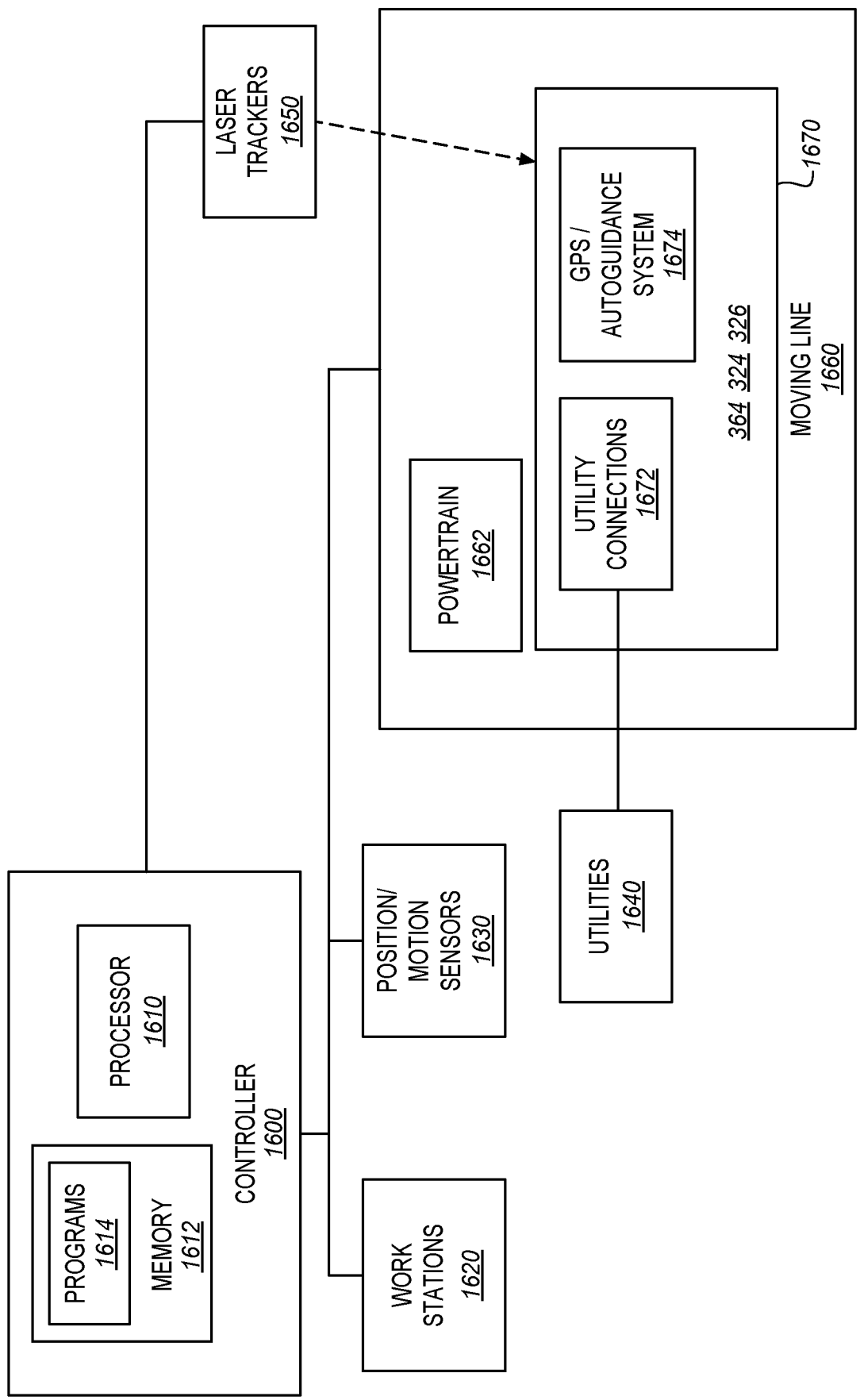
FIG. 9 broadly illustrates control components of a production system in an illustrative embodiment.

Attention is now directed to FIG. 9, which broadly illustrates control components of a production system (e.g., assembly environment 100) that performs continuous manufacturing. A controller 1600 coordinates and controls operation of work stations 1620 (corresponds to any and all of work stations and movement of one or more of the aircraft components described herein)) along a moving line 1660 having a powertrain 1662. The controller 1600 may comprise a processor 1610 which is coupled with a memory 1612 that stores programs 1614. In one example, the mobile platforms 1670 are driven along a moving line 1660 that is driven continuously by the powertrain 1662, which is controlled by the controller 1600. In this example, the mobile platform 1670 includes utility connections 1672 which may include electrical, pneumatic and/or hydraulic quick disconnects that couple the mobile platform 1670 with externally sourced utilities 1640. In other examples, as previously mentioned, the mobile platforms 1670 comprise Automated Guided Vehicles (AGVs) that include on board utilities, as well as a GPS/autoguidance system 1674. Mobile platforms 1670 also include some or all of the indexing systems, bar codes and RFID systems previously discussed. In still further examples, the movement of the mobile platforms 1670 is controlled using laser trackers 1650. Laser trackers 1650 use indexing components, bar code readers or RFID readers. Position and/or motion sensors 1630 coupled with the controller 1600 are used to determine the position of the mobile platforms 1670 as well as the powertrain 1662.

Figure 10:
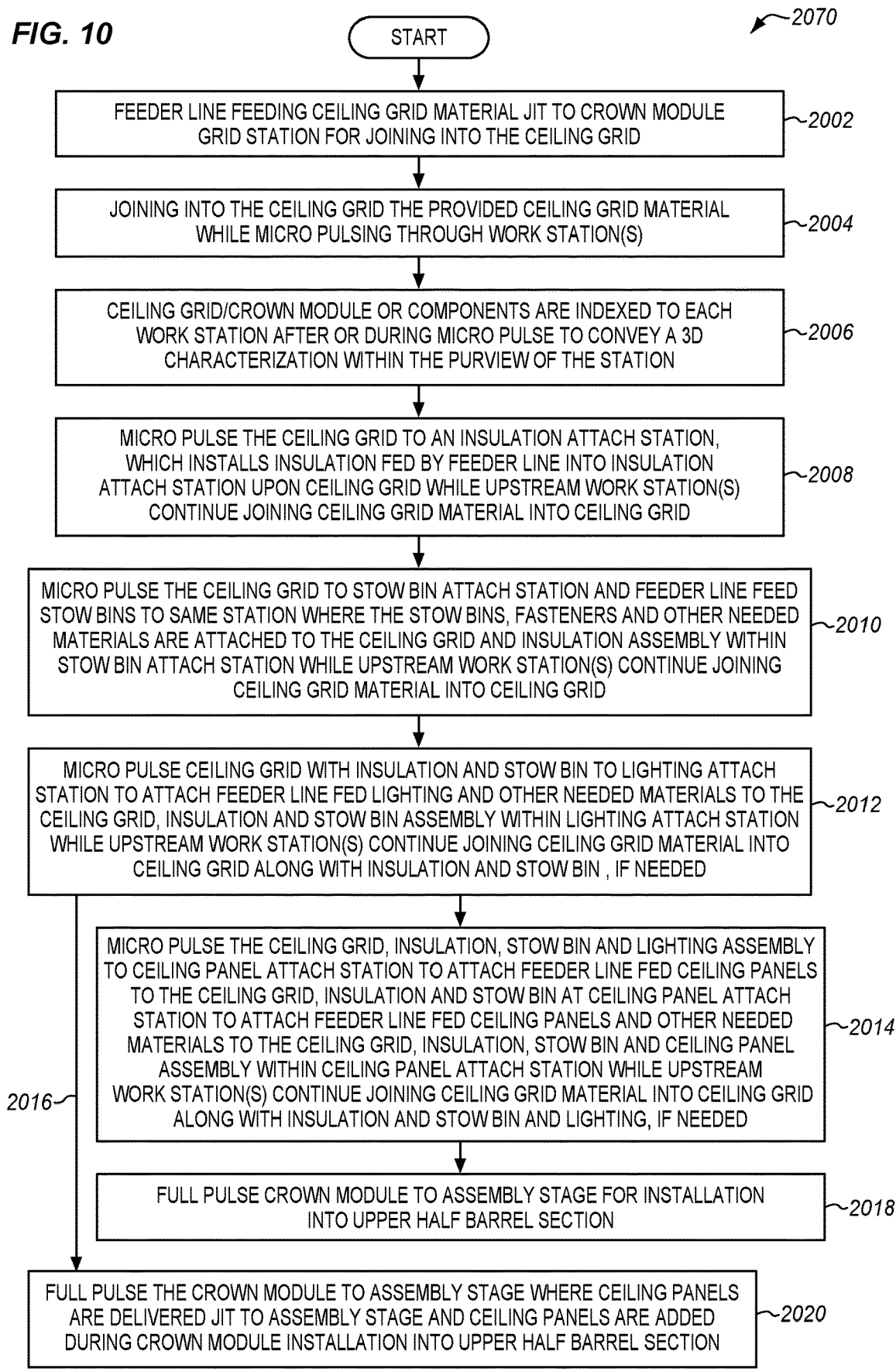
FIG. 10 is a flowchart illustrating a method of fabricating a crown module in an illustrative embodiment.

FIG. 10 is a flowchart of what is depicted in FIG. 5. The crown module 364 is advanced by micro pulse 129-4 through work stations 720-1 through 750 to arrive at an assembly stage 320, 321 for crown module 364 for installation into an upper half barrel section 116, 126, in a full pulse length 123. The crown module 364 is assembled in parallel with the upper half barrel section 116, 126 so that the crown module 364 arrives completed, or nearly complete, for installation to minimize the time the upper half barrel section 116, 126 is in assembly stage 320. Feeder line 773 for the crown module 364 provides it to assembly stage 320, 321 just-in-time and ready for installation into the upper half barrel section 116, 126. The crown module 364 are assembled inverted. The crown module 364 arrives at the assembly stage 320, 321 ready for installation complete, or nearly complete.

In the method of FIG. 10, feeder lines 722-1, 722-2 feed 2002 ceiling grid material 732-2 JIT to work station 720-1, 720-2 for joining into the ceiling grid. The ceiling grid and the provided ceiling grid material are joined 2004 while micro pulsing through work stations 720-1, 720-2.

Ceiling grid/crown module or components are indexed 2006 to each work station after or during micro pulse to convey a 3D characterization within the purview of the work station. In FIG. 5 micro pulse 129-4 is illustrated as having a length equal to the space between two adjacent work stations or equal to the purview 774 or some multiple or fraction thereof. The work stations 720-1, 720-2, 730, 740, 760-1, 760-2, and 750 index to the crown module 364 as it advances through the floor grid feeder line, feeder line 773, during pauses between micro pulses 129-4 and/or during micro pulses 129-4 of the crown module 364. The crown module 364 is indexed 2006 to each of the serially arranged work stations 720-1, 720-2, 730, 740, 760-1, 760-2, and 750 singularly or in multiples to convey a 3D characterization of the crown module 364 within the purview 774 of each work station 720-1, 720-2, 730, 740, 760-1, 760-2, and 750 prior to work stations 720-1, 720-2, 730, 740, 760-1, 760-2, and 750 working upon the crown module 364.

One or more work stations 720-1, 720-2, 730, 740, 760-1, 760-2, and 750 perform work upon the crown module 364 during pauses between micro pulses 129-4 and/or during micro pulse 129-4. Indexing features 704 (shown in FIG. 4) may be on several of the components described herein that make up the crown module 364 or on several portions of a moveable jig conveying the crown module 364. The crown module 364 is assembled in parallel to the upper half barrel section 116, 126 and arriving JIT at the assembly stage 320, 321 for installation into the upper half barrel section 116, 126.

The crown module 364 continues assembly on feeder line 773 by micro pulses 129-4 through serially arranged work stations 720-1, 720-2, 730, 740, 760-1, 760-2, and 750 the associated feeder lines 722-1, 722-2, 732, 742, 762-1, 762-2, and 752 delivering JIT, the insulation 731, only the right stow bins, the electrical and lighting systems 761-1, 761-2 and then the ceiling panels 751, respectively, for assembly into crown module 364.

Continuing with the flowchart, the ceiling grid is micro pulsed 2008 to an insulation attach work station 730, which installs the insulation 731 fed by feeder line 732 into insulation attach work station 730 upon ceiling grid while upstream work station(s) continue joining ceiling grid material into ceiling grid.

The ceiling grid is micro pulsed 2010 to stow bin attach work station 740 and feeder line 742 feeds stow bins 741 to same work station where the stow bins 741, fasteners and other needed materials are attached to the ceiling grid and insulation assembly within stow bin attach work station 740 while upstream work stations (e.g., 720-1, 720-2, 730) continue joining ceiling grid material and placing insulation into ceiling grid.

The ceiling grid with insulation and stow bin is micro pulsed 2012 to lighting attach work station 760-1 to attach feeder line 762-1 fed lighting and other needed materials to the ceiling grid, insulation and stow bin assembly within lighting attach work station 760-1 while upstream work stations (e.g., 720-1, 720-2, 730, 740) continue joining ceiling grid material into ceiling grid along with insulation and stow bin. As the installation of electrical and lighting might take longer, work station 760-2 is also incorporated, with the micro pulsing 2012 occurring each time.

Next, the ceiling grid, insulation, stow bin and lighting assembly of the crown module are micro pulsed 2014 to ceiling panel attach work station 750 to attach feeder line 752 fed ceiling panels 751 to the ceiling grid, insulation and stow bin at ceiling panel attach work station 750 to attach feeder line fed ceiling panels and other needed materials to the ceiling grid, insulation, stow bin and ceiling panel assembly within ceiling panel attach station while upstream work stations (e.g., 720-1, 720-2, 730, 740, 760-1, 760-2) continue joining ceiling grid material into ceiling grid along with insulation and stow bin and lighting, if needed.

Crown module 364 is full pulsed 2018 to assembly stage 320, 321 for installation into upper half barrel section 116, 126-1. Optionally, the crown module 364 without ceiling panels does not go through ceiling panel installation and instead advances directly to assembly stage 320.

Finally, the crown module 364 is full pulsed 2020 without ceiling panels to assembly stage 320, 321 where ceiling panels are delivered JIT to assembly stage 320, 321 and ceiling panels are added during crown module 364 installation into upper half barrel section 116, 126.

Figure 11:
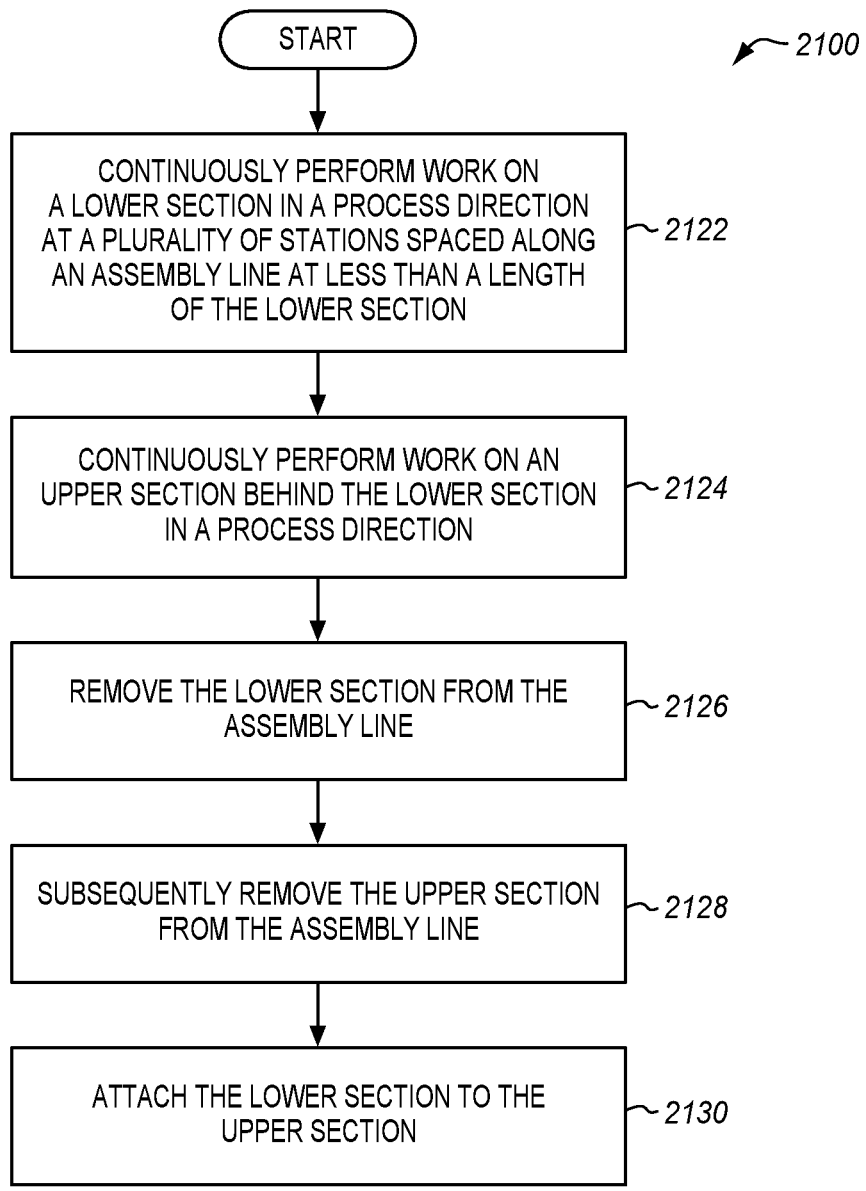
FIG. 11 is a flowchart illustrating a method of fabricating a portion of an airframe.

FIG. 11 is a flowchart 2100 illustrating methods of fabricating portions of an airframe (e.g., full barrel sections) in illustrative embodiments. The methods illustrated include continuously performing 2122 work on a lower half barrel section 118, 128 in a process direction 199 at a plurality of work stations 114, 124 spaced along an assembly line 110, 120 at less than a length of the lower half barrel section 118, 128. The method further includes continuously performing 2124 work on an upper half barrel section 116, 126 behind the lower half barrel section 118, 128 in the process direction 199. The lower half barrel section 118, 128 is removed 2126 from the assembly line 110, 120. The upper half barrel section 116, 126 is subsequently removed 2128 from the assembly line 110, 120. Finally, the lower half barrel section 118, 128 is attached 2130 to the upper half barrel section 116, 126.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A method for assembling an aircraft, the method comprising:
   receiving an upper half barrel section of a fuselage that is in a crown up orientation at a crown module attach station of a first assembly line;
   advancing the upper half barrel section on a track in a process direction along the first assembly line through a line of serially arranged work stations according to a takt time;
   fabricating a crown module of the aircraft in a second assembly line according to the takt time, wherein the second assembly line is a feeder line to the crown module attach station; and
   installing the crown module into the upper half barrel section at the crown module attach station;
   wherein the crown module and the upper half barrel section are fabricated in parallel such that the crown module and the upper half barrel section arrive at the crown module attach station just in time to install the crown module into the upper half barrel section.

2. The method of claim 1 wherein installing the crown module comprises installing a crown module that is substantially equal in length to the upper half barrel section of the fuselage.

3. The method of claim 1 wherein installing the crown module into the upper half barrel section comprises installing the crown module in a completed state into the upper half barrel section.

4. The method of claim 1 wherein fabricating the crown module comprises fabricating the crown module in the second assembly line that is full pulsed.

5. The method of claim 1 wherein fabricating the crown module comprises fabricating the crown module across work stations of the second assembly line with full pulses between each.

6. The method according to claim 1 further comprising indexing the crown module to a work station using an indexing feature associated with the crown module to an indexing component associated with the work station.

7. The method according to claim 1 wherein fabricating the crown module comprises:
   assembling ceiling grid components into a ceiling grid at a crown module grid work station;
   installing insulation onto the ceiling grid at an insulation attach work station;
   installing stow bins onto the ceiling grid at a stow bin attach work station;
   installing ceiling panels onto the ceiling grid at a ceiling panel attach work station; and
   installing lighting components on to the ceiling grid at a lighting attach work station.

8. The method according to claim 1 further comprising providing components of the crown module to the line of serially arranged work stations using feeder lines.

9. The method according to claim 1 further comprising micro pulsing the crown module through a work station.

10. The method of claim 1 wherein fabricating the crown module further comprises:
    advancing a ceiling grid in a process direction; and
    installing insulation onto the ceiling grid.

11. The method of claim 1 wherein fabricating the crown module further comprises:
    advancing a ceiling grid in a process direction; and
    installing stow bins onto the ceiling grid.

12. The method of claim 1 wherein fabricating the crown module further comprises:
    advancing a ceiling grid in a process direction; and
    installing ceiling panels onto the ceiling grid.

13. The method of claim 1 wherein fabricating the crown module further comprises:
    advancing a ceiling grid in a process direction; and
    installing lighting onto the ceiling grid.

14. The method of claim 1, further comprising:
    installing crown module components onto a ceiling grid using a plurality of work stations of the second assembly line;
    advancing the ceiling grid in a process direction through the work stations; and
    providing a crown module component to the work stations via a feeder line associated with one of the work stations just in time for installation onto the ceiling grid.

15. The method of claim 14, wherein:
    at least one of the work stations is a crown module grid work station; and
    the feeder line associated with one of the work stations provides ceiling grid components to the crown module grid work station for fabrication into the ceiling grid.

16. The method of claim 14, wherein:
    at least one of the work stations is an insulation attach work station; and
    the feeder line associated with one of the work stations provides insulation to the insulation attach work station for attachment to the ceiling grid.

17. The method of claim 14, wherein:
    at least one of the work stations is a stow bin work station; and
    the feeder line associated with one of the work stations provides stow bin components to the stow bin work station for attachment to the ceiling grid.

18. The method of claim 14, wherein:
    at least one of the work stations is a ceiling panel work station; and
    the feeder line associated with one of the work stations provides ceiling panel components to the ceiling panel work station for attachment to the ceiling grid.

19. The method of claim 14, wherein:
    at least one of the work stations is a lighting attach work station; and
    the feeder line associated with one of the work stations provides lighting components to the lighting attach work station for attachment to the ceiling grid.

20. The method of claim 14, wherein at least two of the work stations are operable to attach the crown module components onto the ceiling grid simultaneously.

21. The method of claim 14 further comprising indexing the plurality of work stations with indexing components associated with each of the plurality of work stations, the indexing components operable to interface to an indexing feature associated with the ceiling grid to control a position of the ceiling grid with respect to a respective work station.

22. The method of claim 1, wherein multiple work stations of the first assembly line perform work on the upper half barrel section simultaneously while the half barrel section advances on the track.

23. The method of claim 1, further comprising:
    advancing the upper half barrel section with the installed crown module along the first assembly line to a join station for attachment to a lower half barrel section.

24. The method of claim 1, further comprising:
providing work instructions to the work stations based on feedback received from communication between indexing features located on the upper half barrel section and indexing components located on the work stations.

25. The method of claim 1, wherein a gap is present between a first upper half barrel section and a second upper half barrel section on the first assembly line such that a work station of the line of serially arranged work stations can receive maintenance while the work station is positioned in the gap as the first upper half barrel section and the second upper half barrel section advance in the process direction.

* * * * *